(12) United States Patent
Zadrozny et al.

(10) Patent No.: US 12,417,569 B2
(45) Date of Patent: Sep. 16, 2025

(54) COMPUTER IMPLEMENTED METHOD AND SYSTEM FOR INTEGRATIVE CAUSAL MODELING AND TRANSFER

(71) Applicant: The University Of North Carolina At Charlotte, Charlotte, NC (US)

(72) Inventors: Wlodek Zadrozny, Charlotte, NC (US); Wenwen Dou, Charlotte, NC (US); Victor Zitian Chen, Charlotte, NC (US); Seethalakshmi Gopalakrishnan, Charlotte, NC (US)

(73) Assignee: The University Of North Carolina At Charlotte, Charlotte, NC (US)

( * ) Notice: Subject to any disclaimer, the term of this patent is extended or adjusted under 35 U.S.C. 154(b) by 145 days.

(21) Appl. No.: 18/525,940

(22) Filed: Dec. 1, 2023

(65) Prior Publication Data

US 2024/0185491 A1    Jun. 6, 2024

Related U.S. Application Data

(60) Provisional application No. 63/429,586, filed on Dec. 2, 2022.

(51) Int. Cl.
*G06T 11/20* (2006.01)
*G06N 3/08* (2023.01)

(52) U.S. Cl.
CPC .............. *G06T 11/206* (2013.01); *G06N 3/08* (2013.01); *G06T 2200/24* (2013.01)

(58) Field of Classification Search
CPC ..... G06T 11/206; G06T 2200/24; G06N 3/08; G06N 5/022
See application file for complete search history.

(56) References Cited

U.S. PATENT DOCUMENTS 7,139,752 B2    11/2006    Broder et al.
8,887,286 B2    11/2014    Dupont et al.
(Continued)

FOREIGN PATENT DOCUMENTS

CN    113569572 A    10/2021
WO    2017037326 A1    3/2017

OTHER PUBLICATIONS

Sinha M, Tadepalli P, Ramsey SA (2021) Voting-based integration algorithm improves causal network learning from interventional and observational data: An application to cell signaling network inference. Plos One 16(2): e0245776.
(Continued)

*Primary Examiner* — Jeffery A Brier
(74) *Attorney, Agent, or Firm* — Clements Bernard Walker; Christopher L. Bernard

(57) ABSTRACT

A hypergraph user interface for interaction with a system for integrative causal modeling from natural language text and including a natural language text input element configured to receive a designation of a natural language text file or such a file. The input element causes the designation or natural language text file to be communicated to at least one natural language processing module. The hypergraph user interface further includes a causal hypergraph visualization element representative of directed hypergraph data generated from the at least one natural language processing module. Selection of a hypergraph element of the causal hypergraph representation causes the hypergraph user interface to communicate an indication of the hypergraph element to a querying module and generate an informative element indicative of at least one of a causal link, a causal statement, or a sentence of the at least one natural text file on which the hypergraph element is based.

20 Claims, 16 Drawing Sheets

(56) References Cited

U.S. PATENT DOCUMENTS

| | | |
|---|---|---|
| 11,593,631 B2 | 2/2023 | Dalli et al. |
| 2018/0260474 A1 | 9/2018 | Surdeanu et al. |
| 2019/0005395 A1 | 1/2019 | Dutkowski |
| 2022/0121939 A1 | 4/2022 | Evans et al. |
| 2022/0188654 A1 | 6/2022 | Knuff et al. |
| 2023/0079455 A1 | 3/2023 | Dasgupta et al. |
| 2023/0297720 A1 | 9/2023 | Harvey |
| 2024/0028997 A1* | 1/2024 | Cheek, Jr ............... G06F 9/54 |

OTHER PUBLICATIONS

Xiaojun Chang, Pengzhen Ren, Pengfei Xu, Zhihui Li, Xiaojiang Chen, and Alex Hauptmann (2021) A Comprehensive Survey of Scene Graphs: Generation and Application. See: arXiv:2104.01111.

Elif Hilal Korkut and Elif Surer (2022) "Visualization in Virtual Reality: a Systematic Review". See arXiv:2203.07616.

Kortemeyer, G. (2022). Virtual-Reality graph visualization based on Fruchterman-Reingold using Unity and SteamVR. Information Visualization, vol. 21[2], 143-152.

N. Capece, U. Erra and J. Grippa (2018) "GraphVR: A Virtual Reality Tool for the Exploration of Graphs with HTC Vive System," 2018 22nd International Conference Information Visualisation (IV), Fisciano, Italy, 2018, pp. 448-453.

Y. Gao, et al. (2020) "Hypergraph Learning: Methods and Practices" in IEEE Transactions on Pattern Analysis & Machine Intelligence, vol. 44, No. 05, pp. 2548-2566.

M. Fischer, et al. (2020) "Visual analytics for temporal hypergraph model exploration." IEEE Transactions on Visualization and Computer Graphics. vol. 27, No. 2, pp. 550-560.

Yang, J., Han, S.C. & Poon, J. (2022) A survey on extraction of causal relations from natural language text. Knowl Inf Syst 64, 1161-1186.

Klamt S, Haus UU, Theis F (2009) Hypergraphs and Cellular Networks. PLOS Computational Biology 5(5): e1000385.

Ilaria Tiddi, Stefan Schlobach (2022) Knowledge graphs as tools for explainable machine learning: A survey, Artificial Intelligence, vol. 302, 103627.

Li, L., Jiang, H., Wen, G. et al. (2022) TE-HI-GCN: An Ensemble of Transfer Hierarchical Graph Convolutional Networks for Disorder Diagnosis. Neuroinform 20, 353-375.

Hematialam, H. (2021). Knowledge extraction and analysis of medical text with particular emphasis on medical guidelines. Unc Charlotte Electronic Theses And Dissertations.

Hossein Hematialam, Wlodek W. Zadrozny. Identifying Condition-action Statements in Medical Guidelines: Three Studies using Machine Learning and Domain Adaptation, May 11, 2021, Preprint (Version 1) available at Research Square [https://doi.org/10.21203/rs.3.rs-500521/v1].

B. Du et al (2021) "Hypergraph Pre-training with Graph Neural Networks" See arXiv:2105.10862.

* cited by examiner

COMPUTER IMPLEMENTED METHOD AND SYSTEM FOR INTEGRATIVE CAUSAL MODELING AND TRANSFER

CROSS-REFERENCE TO RELATED APPLICATION

The present disclosure claims the benefit of priority of co-pending U.S. Provisional Patent Application 63/429,586, filed on Dec. 2, 2022, and entitled "A COMPUTER IMPLEMENTED METHOD AND SYSTEM FOR INTEGRATIVE CAUSAL MODELING AND TRANSFER," the contents of which are incorporated in full by reference herein.

GOVERNMENT SUPPORT CLAUSE

This invention was made with government support under award no. 2141124 from the National Science Foundation (NSF). The government has certain rights in the invention.

TECHNICAL FIELD

The present disclosure relates generally to computer systems, artificial intelligence, and data analysis, and more particularly to causality analysis.

BACKGROUND

Causal reasoning is ubiquitous and is used in understanding human behavior, organizational performance, the impact of medical interventions, to mention just a few examples. There is a vast amount of research publications analyzing causal dependencies. For example, there are tens of thousands of publications appearing every year about organizational behavior. In medicine, there are currently close to forty thousand medical guidelines indexed on PubMed as "practice guideline", and two orders of magnitude of articles that are used to produce the guidelines. All of them use causal statements.

Clearly, there is a need to understand and organize causal relations as expressed for example in text. For example, which sets of factors contribute to lower/higher life expectancy of a population. In another example, which sets of management interventions contribute to the well-being of the different sets of stakeholders of a corporation (customers, employees, investors, and community/environment). In yet another example, which collections of proteins (via promotions or inhibition paths) produce other, harmful or beneficial, proteins. Or which hospital/physician groups perform in some categories of health services. For these and similar examples, there exist collections of research findings, or proprietary information, such as patient records, which can be automatically analyzed.

There exist systems for extracting causal knowledge using text mining techniques. Typically, using lexical and syntactic clues in combination with machine learning. There exist also methods and systems for representing causality. For example, they represent causal relationships as graphs, use probabilistic reasoning techniques to reason from premises to conclusions, and perform abductive reasoning from conclusions to premises, that is, finding causes of states and events.

"A Comprehensive Survey of Scene Graphs: Generation and Application" by Xiaojun Chang, Pengzhen Ren, Pengfei Xu, Zhihui Li, Xiaojiang Chen, and Alex Hauptmann shows multicolor organization of information in a graph and is hereby incorporated by reference. See arXiv:2104.01111v5 [cs.CV] (revised Jan. 22, 2022). "Visualization in Virtual Reality: a Systematic Review" by Elif Hilal Korkut and Elif Surer discloses virtual reality and associated graphs and is hereby incorporated by reference. See arXiv:2203.07616 [cs.HC] (submitted Mar. 15, 2022). "Virtual-Reality Graph Visualization based on Fruchterman-Reingold using Unity and SteamVR" by Gerd Kortemeyer discloses a haptic system for interacting with graphs and is hereby incorporated by reference. See *Information Visualization*, vol. 21[2], 143-152, 2022. "Graph VR: A Virtual Reality Tool for the Exploration of Graphs with HTC Vive System" by Nicola Capece, Ugo Erra, and Jari Grippa discloses an exploration system for graphs using VR display and is hereby incorporated by reference. See 2018 *22nd International Conference Information Visualisation (IV)*, Fisciano, Italy, 2018, pp. 448-453, doi: 10.1109/iV.2018.00084.

Despite the existing needs, none of the systems known today for extracting and representing causality integrates information from multiple textual sources in a way which can be modified and queried by the user. Furthermore, no existing systems can be extended to new domains using machine learning transfer.

As such, a need exists in the art for a new system to provide integrated causal models which would enable interventions involving several causal variables, based on data from multiple textual resources and overcome the above limitations.

This background is provided as an illustrative contextual environment only. It will be readily apparent to those of ordinary skill in the art that the systems and methods of the present disclosure may be implemented in other contextual environments as well.

SUMMARY

Therefore, it is an object of the present disclosure to provide a computer implemented method and system for integrative causal modeling and transfer that overcomes the deficiencies of prior causal modeling systems and methods. In preferred embodiments, the system through a computer processor generates hypergraph-based representations of causal dependencies from multiple sources to support interaction and querying of causal knowledge to benefit analysis and decision-making of people and organizations. In some embodiments, the system and method comprise the steps of extraction, analysis, integration, and representation of causal statements from sources such as documents. Additionally, the system is configured to build a representation of the extracted knowledge as a hypergraph, network of networks, or a graph within the said system, and providing an interface for querying and analyzing the said representation.

To achieve the foregoing and other objects and advantages, in one aspect, the present subject matter is directed to a hypergraph user interface for interaction with a system for integrative causal modeling from natural language text. The hypergraph user interface includes a natural language text input element configured to receive at least one of a designation of a natural language text file or a natural language text file and, in response to the received at least one designation or natural language text file, cause the at least one designation or natural language text file to be communicated to at least one natural language processing module of the system. The hypergraph user interface further includes a causal hypergraph visualization element representative of directed hypergraph data generated from the at least one natural language processing module of the system. In response to selection of a hypergraph element of the causal hypergraph representation, the hypergraph user interface is configured to communicate an indication of the hypergraph element to a querying module of the system and generate, in association with the causal hypergraph visualization, an informative element indicative of at least one of a causal link, a causal statement, or a sentence of the at least one natural text file on which the hypergraph element is based.

In at least one embodiment, when the directed hypergraph data includes multivariable hypergraph data, at least one hypergraph element of the casual hypergraph visualization may indicate multivariable, directed causality. In an additional or alternative embodiment, the at least one natural language processing module of the system may include at least one module suitable for transfer learning. Additionally or alternatively, in response to the selection of the hypergraph element, the hypergraph user interface may be configured to reorient the casual hypergraph visualization element to emphasize the selected hypergraph element. In some embodiments, the informative element may include at least one of a table or chart.

In additional or alternative embodiments, the causal hypergraph visualization element may include a plurality of nodes associated with a plurality of taxonomy categories. In some such embodiments, the causal hypergraph visualization element may include a plurality of directed edges connecting two or more nodes of the plurality of nodes. Each directed edge may include an indicator indicative of at least one of a number of causal statements associated with the directed edge, the strength of a causal association of at least one causal statement associated with the directed edge, or a strength of the association between at least one of the connected nodes and at least one casual statement associated with the directed edge. In additional or alternative embodiments, the causal hypergraph visualization element may include a first-order nodal diagram. The first-order nodal diagram may include a performance node representing the nodes of the directed hypergraph data associated with the taxonomy categories and a non-performance node representing one or more portions of causal statements not associated with at least one of the taxonomy categories. In some such embodiments or alternative embodiments, the hypergraph user interface may be configured to generate, in response to a selection of one of the performance node or the non-performance node, a second-order causal hypergraph visualization element including nodes associated with the selected node of the first-order nodal diagram. Additionally or alternatively, the second-order causal hypergraph visualization element may include a plurality of edges, where each edge may connect at least one node associated with a taxonomy category to at least one other node. In some embodiments, the plurality of edges may indicate multivariable, directed hypergraph data.

In additional or alternative embodiments, the hypergraph user interface may be configured such that at least one of a layout of the hypergraph user interface including at least one of the causal hypergraph visualization element or the informative element or a user-initiated change in the at least one of the causal hypergraph visualization element or the informative element is provided as visualization training data to a visualization module configured to generate the causal hypergraph visualization element or the informative element. Additionally or alternatively, the visualization module may include a deep learning network. In some such embodiments, the visualization training data may be utilized to train the deep learning network.

In an additional or alternative aspect, the present subject matter is directed to a system for integrative causal modeling from natural language text. The system includes a causal identification module including instructions stored in at least one memory and executable by one or more processors to cause the causal identification module to identify, from at least one natural language text file, a plurality of causal links utilizing natural language processing. Each causal link includes a causal portion and an output portion. The system further includes a normalization module including instructions stored in at least one memory and executable by one or more processors to cause the normalization module to identify whether each causal portion and each output portion of each causal link is associated with a taxonomy category of a plurality of predefined taxonomy categories. The system further includes a visualization and querying module including instructions stored in at least one memory and executable by one or more processors to cause the visualization and querying module to generate a causal hypergraph visualization utilizing interface hardware associated with the system. The causal hypergraph visualization generated from directed hypergraph data represents the causal statements and associations with the predefined taxonomy categories of the at least one natural language text file.

In at least one embodiment, the visualization and querying module may further include instructions stored in the at least one memory and executable by the one or more processors to cause the visualization and querying module to receive a selection of an element of the causal hypergraph visualization. In some such embodiments, the instructions may further cause the visualization and querying module to generate, in response to the selected element of the causal hypergraph visualization, at least one of a causal link indicated by the selected element, at least one causal statement on which the at least one causal link is based, at least one sentence of the at least one natural language text file on which the at least one causal link is based, or a combination of the preceding.

In additional or alternative embodiments, the causal identification module may further include instructions stored in the at least one memory and executable by the one or more processors to cause the causal identification module to receive the at least one natural language text file. In some such embodiments, the instructions may further cause the causal identification module to identify a plurality of causal statements included in the at least one natural language text file utilizing natural language processing. The casual links may be identified from the identified plurality of causal statements. Additionally or alternatively, the causal identification module may include a transformer-based deep learning model.

In additional or alternative embodiments, the visualization and querying module may include instructions stored in the at least one memory and executable by the one or more processors to cause the visualization and querying module to generate the causal hypergraph visualization utilizing at least one of a haptic interface device, a virtual reality interface device, or a multimodal interface device. In further or other embodiments, the visualization and querying module may include instructions stored in the at least one memory and executable by the one or more processors to cause the visualization and querying module to receive a selection of an element of the causal hypergraph visualization communicated from at least one of the haptic interface device, the virtual reality interface device, or the multimodal interface device.

In some further or alternative embodiments, the directed hypergraph data may include multivariable, directed hypergraph data. Additionally or alternatively, the system may further include a hypergraph data generation module including instructions stored in at least one memory and executable by one or more processors to cause the hypergraph data generation module to generate the directed hypergraph data based on the identified plurality of causal links and the associations of the causal links with the plurality of predefined taxonomy categories. Some such embodiments or different embodiments of the system may further include a translation module communicatively coupled to the visualization and querying module, the at least one natural language text file, and at least one data file including the directed hypergraph data and data indicative of the casual links normalized with respect to the predefined taxonomy categories. In additional or alternative embodiments, each of the causal identification module and the normalization module may include at least one module suitable for transfer learning.

Embodiments of the invention can include one or more or any combination of the above features and configurations.

Additional features, aspects, and advantages of the invention will be set forth in the detailed description of illustrative embodiments that follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed. The accompanying drawings are included to provide a further understanding of the invention and are incorporated in and constitute a part of this specification.

BRIEF DESCRIPTION OF THE DRAWINGS

A full and enabling disclosure of the present invention, including the best mode thereof, directed to one of ordinary skill in the art, is set forth in the specification, which makes reference to the companying drawings, in which.

Repeat use of reference characters and like reference characters in the present specification and drawings is intended to represent the same or analogous features or elements of the present invention.

DESCRIPTION OF ILLUSTRATIVE EMBODIMENTS

Figure 1:
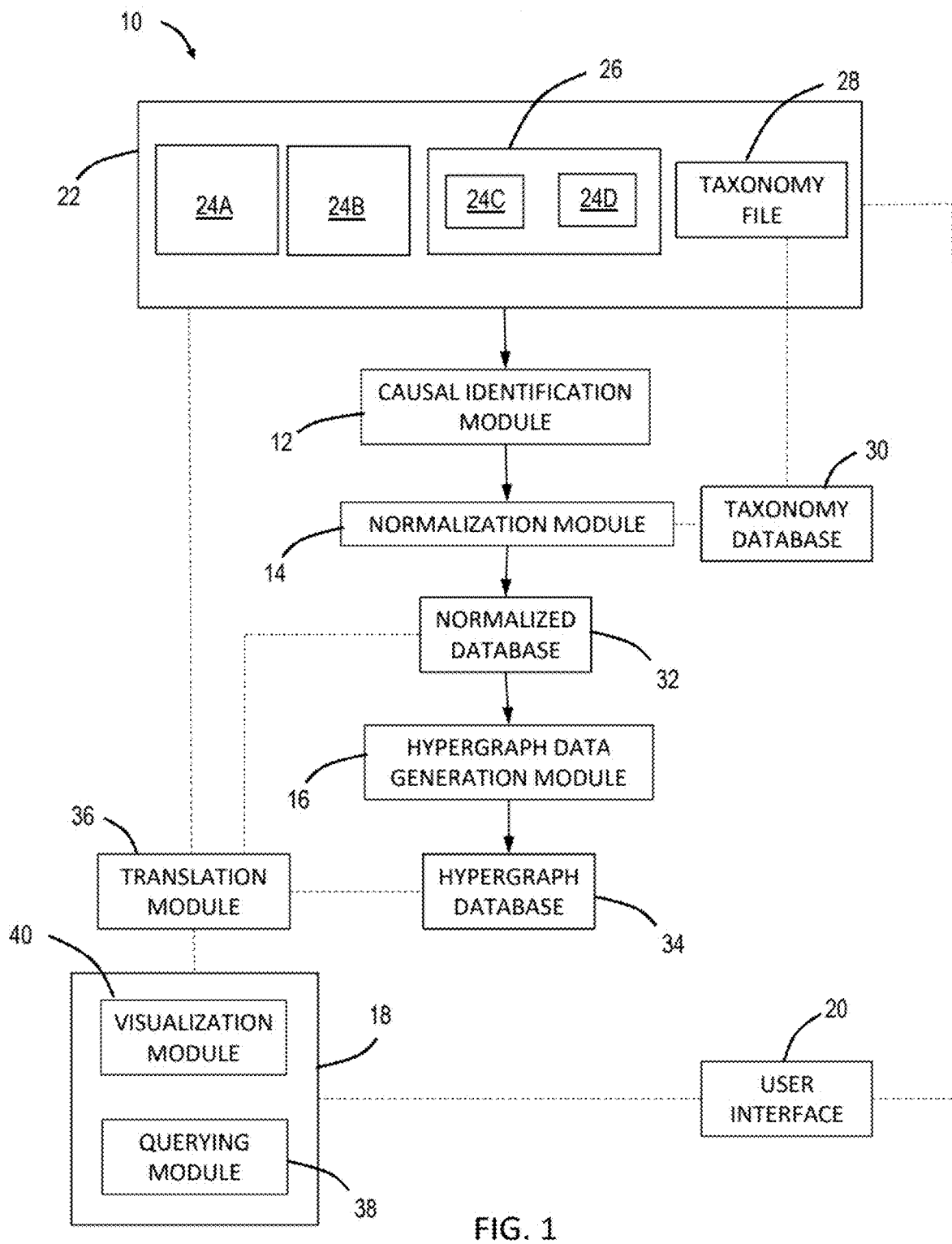
FIG. 1 illustrates a schematic diagram of an exemplary embodiment of a system for integrative causal modeling from natural language text, in accordance with aspects of the present subject matter.

The present invention will now be described more fully hereinafter with reference to the accompanying drawings in which exemplary embodiments of the invention are shown. However, the invention may be embodied in many different forms and should not be construed as limited to the representative embodiments set forth herein. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. It is envisioned that other embodiments may perform similar functions and/or achieve similar results. Any and all such equivalent embodiments and examples are within the scope of the present invention and are intended to be covered by the appended claims.

The exemplary embodiments are provided so that this disclosure will be both thorough and complete and will fully convey the scope of the invention and enable one of ordinary skill in the art to make, use, and practice the invention. The word "exemplary" is used herein to mean "serving as an example, instance, or illustration." Any implementation described herein as "exemplary" is not necessarily to be construed as preferred or advantageous over other implementations.

The terms "coupled," "fixed," "attached to," "communicatively coupled to," "operatively coupled to," and the like refer to both direct coupling, fixing, attaching, communicatively coupling, and operatively coupling as well as indirect coupling, fixing, attaching, communicatively coupling, and operatively coupling through one or more intermediate components or features, unless otherwise specified herein. "Communicatively coupled to" and "operatively coupled to" can refer to physically and/or electrically related components.

The terminology used herein is for the purpose of describing particular embodiments only and is not intended to be limiting of the invention. As used herein, the term "and/or" includes any and all combinations of one or more of the associated listed items. As used herein, the terms "first", "second", and "third" may be used interchangeably to distinguish one component from another and are not intended to signify location or importance of the individual components. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now specifically to FIG. 1, a schematic diagram of an exemplary embodiment of a system for integrative causal modeling from natural language text is illustrated in accordance with aspects of the present subject matter. The system 10 is generally suitable for extracting causality information from at least one natural text file, such as multiple natural text file. A natural text file is generally a file, document, or the like (e.g., a .pdf, .word, text file, and/or suitable variations and alternatives) including or indicative of structured or unstructured script in a language typically used for human communication, e.g., English, French, Spanish, Mandarin, German, and the like. The system 10 is generally suitable to receive the natural language text file(s), extract causality information within the received natural language text file(s), and generate a representation such as a hypergraph via a display associated with the system 10 and/or hypergraph data (e.g., data suitable for generation of a hypergraph) enabling programmatical use of the said hypergraph and/or hypergraph data. Embodiments of the system 10 may allow for a more expressive representation of an environmental state and the effect(s) of interventions on the environmental state. For example, the system 10 may provide improved representation of the joint effects of multiple drugs on the human body and/or different system of the human body (e.g., circulation system, nervous system, digestive system). As another example, the system 10 may facilitate determining the likely effect various management decisions will have on key performance indicators of a business association, company, agency, non-profit organization, or the like.

As shown, embodiments of the system 10 may include one or more modules including or associated with instructions stored in at least one memory and executable by one or more processors to cause the processor(s) to implement steps, method elements, or the like as described herein. In some embodiments, the system 10 may include a causal identification module 12 configured to identify a plurality of causal statements included in the natural language text file(s) utilizing natural language processing. The system 10 may further include a normalization module 14 configured to identify whether portions of the causal statements identified by the identification module are associated with one or more pre-defined taxonomy categories utilizing natural language processing. A hypergraph data generation module 16 may generate directed hypergraph data based on the casual statements normalized to the taxonomy categories of the normalization module 14. A visualization and querying module 18 allows for generation of visual hypergraphs, subgraphs, subhypergraphs, and directed graphs from the generated hypergraph data and querying and modification of the source natural language text file(s) and the generated hypergraph data.

While the system 10 is described herein with respect to the above-mentioned modules, it should be appreciated that the system 10 may include additional or alternative programming structures where logical steps are organized in other disclosed modules or additional or alternative modules. In some embodiments, a single module may be configured to implement all or some of the logical functions described herein. For example, a single integration module may be configured to perform some or all of the tasks of the causal identification module 12, the normalization module 14, the hypergraph data generation module 16, visualization and querying module 18, translation modules, and/or programming interfaces allowing communication between such modules, and/or interfaces allowing for user interaction with the system 10 and/or a suitably configured system for integrative causal modeling from natural language text. The disclosed modules herein are provided simply for convenience of understanding of the steps, instructions, and/or logical operations of the system 10.

Referring still to FIG. 1, various embodiment of the system 10 may include or be associated with a user interface 20 allowing interaction with the system 10 and/or components thereof. For instance, the user interface 20 may include at least one of a hypergraph user interface, a graphical user interface, a virtual reality user interface, a multimodal visual user interface, or a haptic user interface as described in more detail herein. In some embodiments, input 22 may be provided to the system 10 via the user interface 10. For example, one or more natural language text files (natural language text file 24A and/or natural language text 24B) may be uploaded for natural language processing utilizing the user interface 20. Additionally or alternatively, a user of the system 10 may identify one or more natural language text files in a document database 26 included in one or more memory included or integrated with the system 10 over a local network and/or one or more memory communicatively coupled to the system 10, such a database of natural language text files stored in a server communicatively coupled to the system 10 via a wide area network. In some situations, the natural language text file(s) 24A-24D may include S&P Financial Company 10-K reports or similar financial health documents for a business association, such as a company.

Furthermore, a taxonomy file 28 may similarly be provided or identified from a taxonomy database 30. The taxonomy file 28 may generally be utilized within the normalization module 14 to normalize causal associations identified by the casual identification module 12 based on predefined taxonomy categories, as described in more detail below.

The causal identification module 12 may process the natural language text files 24A/24B and/or read a computer data repository of digital text (e.g., a data repository including files 24C and/or 24D) and extract natural language statements about causes, states, and effects; and extracting specific information from these statements. The causal identification module 12 may extract such information using a combination of standard NLP methods. For instance, in an exemplary natural language text file containing 1000 sentences, 100 of those sentences may indicate causality, to at least some degree, such as causal probability over a predefined threshold, and are thus identified as causal statements. The causal identification module 12 may be configured to identify one or more intra-sentence causal statements or intra-file causal statements of at least one natural language text file. Additionally or alternatively, the causal identification module 12 may be configured to identify one or more inter-sentence causal statements within a natural language text file or inter-file causal statement based on multiple natural language text files.

In some embodiments, identifying the causal statements of the natural language text file(s) 24A-24D may include identifying explicit causality based on the presence of an explicit connective (e.g., trigger word and/or trigger phrase) in at least one casual statement. In further or alternative configurations of the causal identification module 12, identifying the causal statements of the natural language text file(s) 24A-24D may include identifying implicit causality based on semantic information within one or between multiple of the natural language text file(s) 24A-24D.

Once the causal statements have been identified, the causal identification module 12 may generate a plurality of causal links based on the identified plurality of causal statements utilizing natural language processing. Each causal link generally includes a causal portion and an output portion or target portion. Furthermore, a strength of each causal link may be measured or determined based on the number of primary studies and/or natural language text files on which the causal link is determined. Additionally or alternatively, the strength of each causal link may be measured or determined based on a meta-analysis mean size effect and statistically significant marks (and number of replications). The causal identification module 12 may further identify knowledge gaps of the field based on a lack of evidence or representation within the natural language text file(s) indicating that such evidence has not been studied in such files. When a causal link is based, at least in part, on information containing such knowledge gap, the strength of such causal link may be measured or determined based on the number of primary studies per empirical test and/or meta-analysis mean effect and statistically significant marks. Furthermore, the system 10 may track any causal links including or based on such knowledge gap for later indication. For instance, hyperedges, directed edges, and/or resulting hyperdata may include or be associated with an indicator (e.g., a red-colored directed edge or hyperedge) to bring such knowledge gap to the user's attention.

The causal identification module 12 may implement standard natural language processing techniques for identifying the causal statements, generating the causal links, and/or portions thereof. Some embodiments of the causal identification module 12 may implement one or more artificial intelligence algorithms for performing such tasks or associated tasks. Various embodiments of the causal identification module 12 may utilize a machine learning model such as a language model. Furthermore, the causal identification module 12 may include at least one module suitable for transfer learning allowing the causal identification module 12 to be extended to new domains using machine learning transfer. For example, the causal identification module 12 may be trainable on additional data. Thus, the causal identification module 12 may be capable of transfer learning when the said additional data requires changes to, for example, the language model.

As mentioned above, the causal identification module 12 may include or implement one or more artificial intelligence algorithms. For example, the causal identification module 12 may utilize one or more of a transformer-based deep learning model, a knowledge-based algorithm, a statistical machine-learning-based algorithm, a deep-learning-based methodology algorithm, Naive Bayes algorithms, support vector machines, a bidirectional long short-term memory network (BILSTM), a bidirectional long short-term memory network with a conditional random field (BILSTM-CRF), a BILSTM-CRF with flair embeddings, a convolutional neural network (CNN), and/or a recursive neural tensor network (RNTN) model. For instance, transformer-based deep neural networks suitable for use in association with the causal identification module 12 may include a bidirectional encoder representations from transformers (BERT) algorithm, a BERT for sequence classification algorithm, SpanBERT, DistilBERT models, and/or BERT models adapted for token classification for causality extraction.

The output of the causal identification module 12 includes the causal links and/or the components thereof, such as a representation of such casual links, e.g., a database and/or one or more spreadsheets. The representation of the of the causal statements may be normalized using one or more taxonomies, as illustrated by the normalization module 14. For example, the representation of the of the causal statements may be normalized utilizing predefined taxonomy categories stored in a taxonomy database 30 and/or provided with the input 22 via the user interface 20 (e.g., taxonomy file 28). The normalization module 14 may generally utilize the predefined taxonomy categories in combination with standard natural language processing normalizations methods to associate the components of the causal links with the predefined taxonomy categories. For instance, the normalization module 14 may identify whether each causal portion and each output portion of each causal link is associated with a taxonomy category of a plurality of predefined taxonomy categories.

Typically, the taxonomy categories include user-defined taxonomy categories, and the normalization module 14 or subprogram, algorithm, or module thereof is pretrained to identify the predefined taxonomy categories. For instance, the normalization module 14 may be trained utilizing a representation of causal links annotated with the user-defined taxonomy categories, resulting in the predefined taxonomy categories utilized by the normalization module 14. When the taxonomy categories are provided with the natural language text file(s) 24A-24D in the taxonomy file 28, such taxonomy file 28 may include or indicate the result of such training utilizing the annotated representation of causal links or include a representation of causal links annotated with the user-defined taxonomy categories for subsequent training and generation of the predefined taxonomy categories utilized by the normalization module 14. In further or alternative situations, the taxonomy categories may be included or indicated by a computational ontology or taxonomy, such as a medical ontology UMLS, or Wikipedia categories, indicated included within the taxonomy file 28 or identified taxonomy file 28 of the taxonomy database 30. It should be appreciated that normalization of the causal links generated by the causal identification module 12 within the normalization module 14 utilizing the predefined taxonomy categories generally results in a standardized representation of the generated causal links.

As a non-limiting example, the extracted phrases (causal statements) may be related to performance of a business association, e.g., a company, and the predefined taxonomy categories may include or indicate one or more of stakeholders of a business association or key performance indicators of the business association. In some embodiments, such stakeholders and/or taxonomy categories may include or be associated with employees, investors, the community, and/or performance of the company. In another example related to facilitating medical decision making, the causes of the determined causal statements may generally include potential courses of actions and/or treatments, and the outputs may include the result of the courses of action and/or treatments indicated by the appropriate natural language text files (e.g., medical studies, medical trails, medical guidelines, and the like). In this example, the taxonomy categories may include cost of treatment, length of treatment, effectiveness of treatment, and other or alternative key performance indicators in the context of medical treatment.

Once the portions of the causal links associated with one or more of the taxonomy categories have been identified, such associated portions of the causal links may be further identified as performance (associated with one or more of the predefined taxonomy categories) or non-performance (not associated with at least one of the predefined taxonomy categories).

The normalization module 14 may implement standard natural language processing normalizations methods in combination with the predefined taxonomy categories for associating the portions (causal portions and output portions) of the causal statements with the the predefined taxonomy categories. Some embodiments of the normalization module 14 may implement one or more artificial intelligence algorithms for performing such tasks or associated tasks, as described herein. Various embodiments of the normalization module 14 may utilize a machine learning model such as an otology model. Furthermore, the normalization module 14 may include at least one module suitable for transfer learning allowing the normalization module 14 to be extended to new domains using machine learning transfer. For example, the normalization module 14 may be trainable on additional data (e.g., a newly provided taxonomy file 28 with new annotations of user-defined taxonomy categories). Thus, the normalization module 14 may be capable of transfer learning when the said additional data requires changes to, for example, the otology model. In various embodiments, the normalization module 14 may utilize a logistic regression module. For instance, a logistic regression module may be trained on the extracted cause and effect phrases (e.g., the portions of the causal links) along with the predefined taxonomy categories (e.g., stakeholder taxonomy categories).

The output of the normalization module 14 includes the causal links and/or the components thereof, such as a representation of such casual links, e.g., a database and/or one or more spreadsheets (see normalized database 32 normalized with respect to the predefined taxonomy categories utilizing the predefined taxonomy categories stored or determined from the taxonomy database 30 and/or provided taxonomy file 28).

Thereafter, the representation of the normalized causality links (e.g., normalized database 32) may be communicated to the hypergraph generation module 16, which generates hypergraph data indicative of a network of networks and/or integrative hypergraph. For example, the hypergraph generation module 16 may output a representation of an integrated hypergraph or network of the hypergraph data (see hypergraph database 34). The hypergraph database 32 may represent a combination and/or integration of a number of graphs (e.g., directed graphs) and/or hypergraphs (e.g., directed hypergraphs) indicated by the natural language text file(s) 24A-24D. In some embodiments, the hypergraph data generation module 16 may be configured to update a pre-existing hypergraph database 32 based on new, different, modified, or updated natural language text file(s) 24A-24D.

The hypergraph data generation module 16 and/or one or more included programs, subprograms, submodules, etc. is adapted for merging data representing different graphs (directed graphs) of the normalized database 32 based on the nodes (causal portions and output portions of the causal links), normalizations of the nodes with respect to the taxonomy categories, and determined relations. For example, the hypergraph data generation module 16 may merge the data representing graphs and/or hypergraphs included in the normalized database 32 based on synonymy and taxonomical information and/or using vector representation. The resulting hypergraph database 34 may indicate multivariable, directed hypergraph data (when indicated by the natural language text files 24A-D). In some embodiments, the resulting hypergraph database 34 may be organized to indicate and/or produce nested cause-effect hypergraphs (directed hypergraphs).

The hypergraph database 34 may include supporting data structures representing entities and relations (e.g. a database, sub database, or file with entities and relations; including information about the provenance of each record entry). In some embodiments, the supporting data structures of the hypergraph database 34 my include a relational database, a graph database, a key-value store, a vector database, or a combination thereof. Thus, for such embodiments, the hypergraph data generation module 16 may be configured to store the entities and relations as a record in the said database. Additionally or alternatively, the hypergraph data generation module 16 may be configured to communicate with an external program for producing new records and relations from the said stored entities and relations using methods for pattern mining in graphs and hypergraphs and storing said new relations in the said one or more databases.

Furthermore, the hypergraph data generation module 16 may include at least one module suitable for transfer learning allowing the hypergraph data generation module 16 to be extended to new domains using machine learning transfer. For example, the hypergraph data generation module 16 and/or be capable of transfer learning when the said additional data requires changes to, for example, the hypergraph data generation model 16.

The system 10 is generally suitable for displaying the stored relations (hypergraph data representing the normalized causal links) in a visualization system. Thus, and as shown in FIG. 1, the system 10 may include a translation module 36 communicatively coupled to a visualization and querying module 18, the at least one natural language text file 14, and the hypergraph database 34, and the normalized database 32. The translation module 36 allows for communication between the visualization and querying module 18 and the hypergraph database 34 and production of a visual representation of the integrative hypergraph indicated by the hypergraph database 34 and/or include graphs or subgraphs of the integrative hypergraph. The translation module 36 further allows for communication between the visualization and querying module 18 and the normalized database 32 and production of a visual representation of the causal links normalized with respect to the predefined taxonomy categories. The translation module 36 further allows for communication between the visualization and querying module 18 and the natural language text file(s) 24 and reproduction and/or retrieval of the natural language text file(s) 24 or relevant portions(s) thereof.

As further shown in FIG. 1, the system 10 may include the visualization and querying module 18 for enabling visualization and interactive exploration of the said representation (e.g., the data of the hypergraph database 34 and/or the visual representation of the integrative hypergraph or portions thereof). The original data (natural language text file(s) 24), extracted relations, their normalized representations (normalized database 32) and the integrated information (hypergraph database 34) can be queried using an interface (e.g., user interface 20). The same or other interface can be used to modify all this data, keeping track of the provenance of extracted relations and the imposed changes using a separate provenance module.

It should be appreciated that the user interface 20 is not limited to a graphical user interface, and the user interface 20 for visualization, querying, and/or modification can include a hypergraph user interface, a graphical user interface, a virtual reality user interface, a multimodal user interface, and/or a haptic user interface. For example, the system 10 may include or be utilized in association with a display, a mouse, a touch screen, a keyboard, a virtual reality interface device, a haptic interface device, and/or a multimodal interface device. In some embodiments, the virtual reality interface device may include one or more of Fish Tank VR, the Cave Automatic Virtual Environment (CAVE), a head-mounted display, the Oculus Rift, the HTC Vive, Google Daydream, Samsung Gear VR, included or associated control devices (e.g., hand-held input devices, motion-sensing controllers, or the like), and/or other suitably configured virtual reality interface devices or components. In further or alternative embodiments, the haptic interface device may include one or more vibrators, (e.g., a hand-held input device configured to provide vibration feedback, such as a haptic hand-held device associated with a virtual reality interface device). In some embodiments, the multimodal interface device (one or more devices supporting user input and processing of two or more modalities) may include one or more components or subcomponents suitable to communicate data indicative of user speech, lip movement, handwriting, hand gestures, touch, multi-touch, text (e.g., keyboard or virtual keyboard), gaze, user proximity, device tilt, etc. Multimodal interface devices may also be suitable for outputting speech synthesis, graphics, pre-recorded audio, etc. The multimodal user interface may include a fusion-based multimodal interface, an alternative-mode multimodal user interface, a multimodal user interface for controlling the system display, and/or other multimodal user interface suitable for use with the system 10.

Generally, a querying module 38 of the visualization and querying module 18 in combination with the user interface 20 may enable natural language questioning and/or question-answering about the representation (e.g., the data of the hypergraph database 34, the visual representation of the integrative hypergraph indicated by the hypergraph database 34, the normalized database, and/or the natural language text file(s) 24. For instance, the querying module 38 may receive natural language questioning and/or a selection of an element of the causal hypergraph visualization communicated from a mouse, touch screen, keyboard, the haptic interface device, the virtual reality interface device, and/or the multimodal interface device. The querying module 38 of the visualization and querying module 18 in combination with the user interface 20 may be configured to query/acquire data, assert new facts in the hypergraph database 34, and/or perform other database operation, such as removal of data, provenance querying, etc.). The querying module can query (via the translation module 36) the original natural language text file(s) and/or the normalized database.

Furthermore, a visualization module 40 of the visualization and querying module 18 in combination with the user interface 20 may be configured to generate a causal hypergraph visualization utilizing the display, the virtual reality interface device, the haptic interface device, and/or the multimodal interface device associated with the system 10, as described in more detail below. The causal hypergraph visualization generated from directed hypergraph data (indicated by the hypergraph database 34) may represent the causal statements and associations with the predefined taxonomy categories of the natural language text file(s) 24. Thus, the visualization module 40 generally allows for building a representation of the extracted knowledge for the natural language text file(s) 24 as a hypergraph, network of networks, or a graph within or in association with the system 10.

Figure 2:
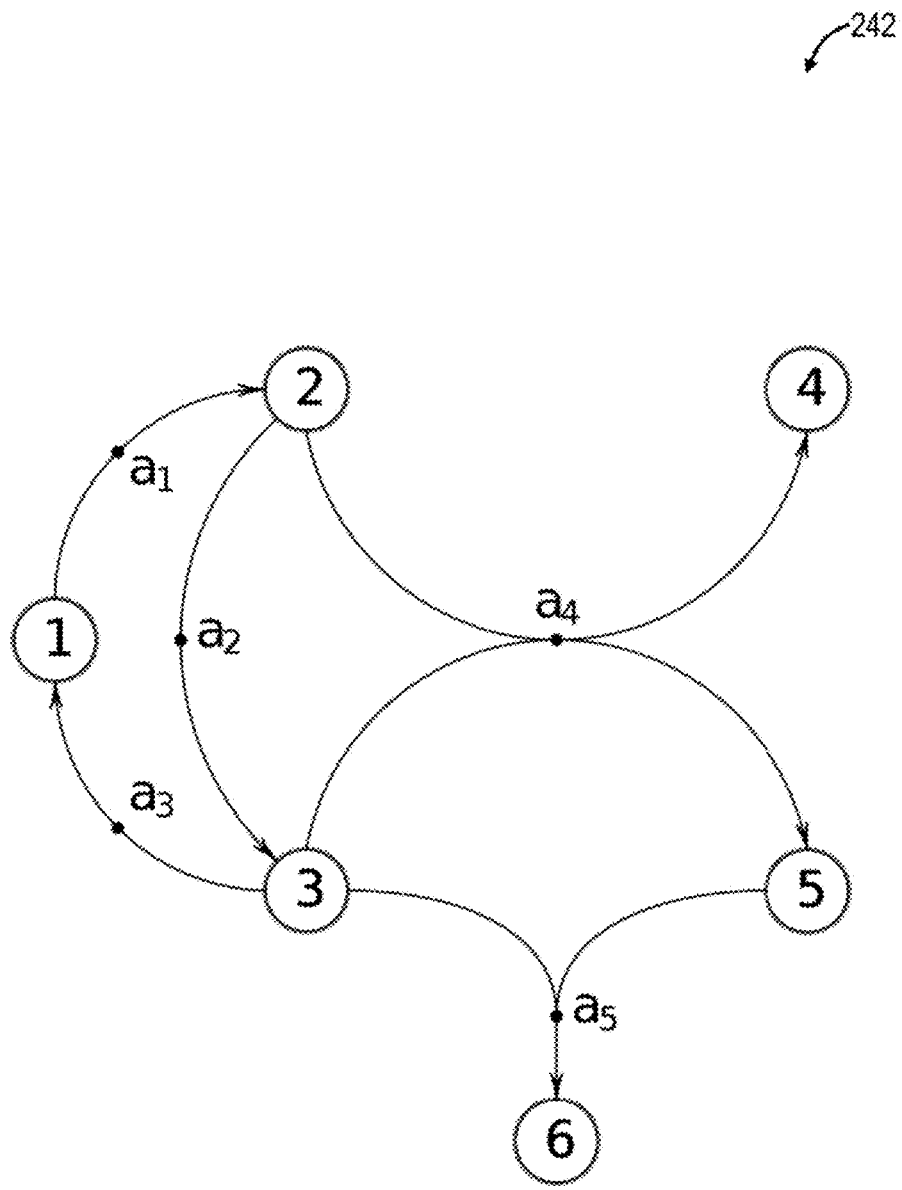
FIG. 2 illustrates an exemplary visualization of a causal hypergraph, in accordance with aspects of the present subject matter.

As shown, at least one start of each directed edge connects a start node and indicates a causal portion of a causal statement indicated by the directed edge and associated with the start node. At least one target of each directed edge connects to a target node and indicates an output portion of the causal statement indicated by the directed edge and associated with the target node. It should be appreciated that cause-effect hypergraphs and/or directed graphs may be nested. For instance, several statements, possibly coming from different natural language text files 24 can be represented as overlapping hypergraphs. Furthermore, each edge may connect at least one node associated with a taxonomy category to at least one other node associated with another taxonomy categories. As illustrated in FIG. 2, the plurality of edges (e.g., hyperedges a4 and a5) may indicate multi-variable, directed hypergraph data.

Figure 3:
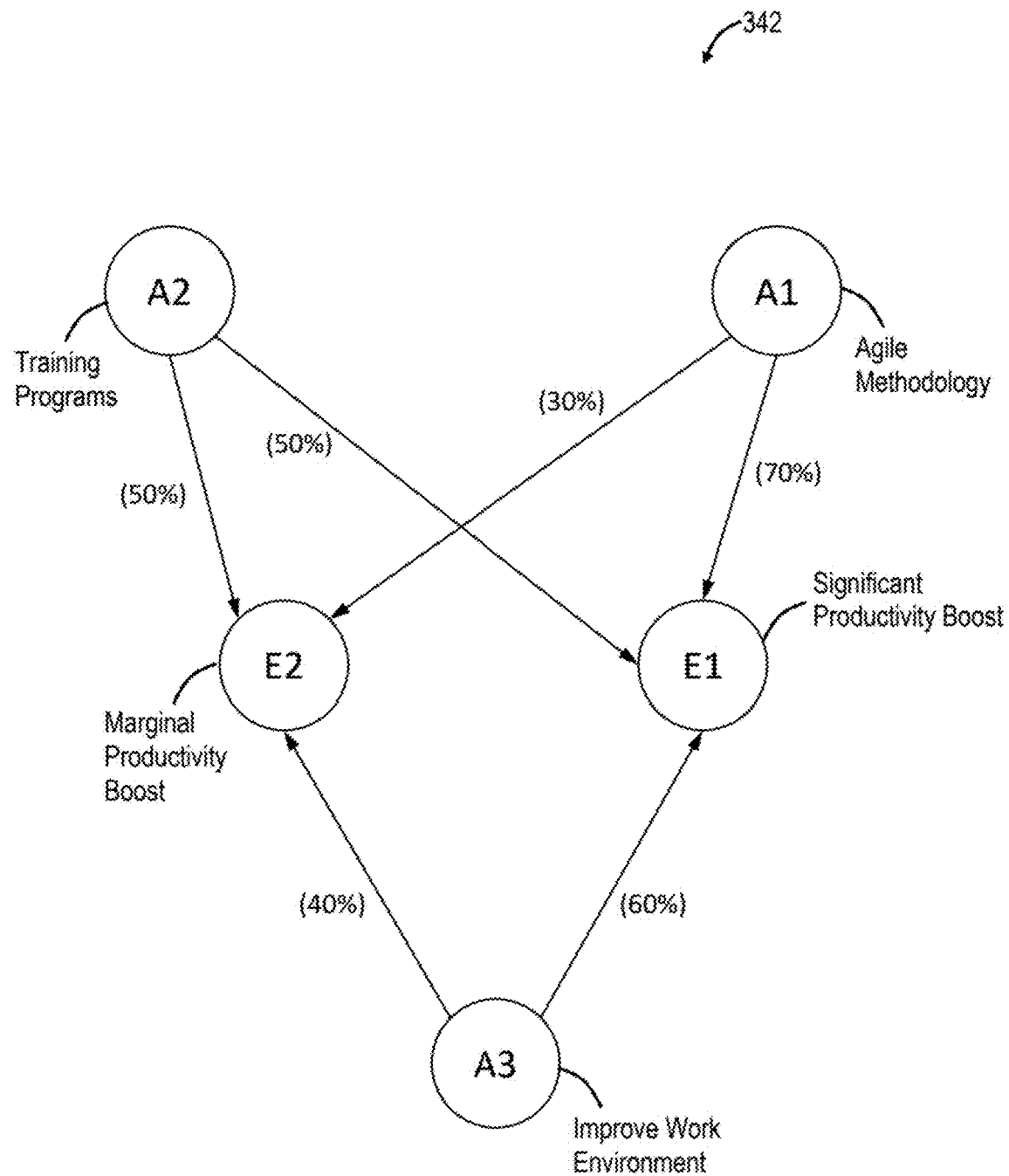
FIG. 3 illustrates an exemplary visualization of another causal hypergraph, in accordance with aspects of the present subject matter.

Referring now to FIG. 3, an exemplary visualization of another causal hypergraph is illustrated in accordance with aspects of the present subject matter. In the embodiment of FIG. 3, causal hypergraph visualization 342 illustrates a knowledge hypergraph in the context of improving employee productivity in a software development company. Thus, the state s' of hypergraph visualization 342 corresponds to the company identifying a need to improve the overall productivity of its software development teams. Potential management actions indicated in FIG. 3 include implementing an Agile Methodology (A1), Enhance Training Programs (A2), and Improve Work Environment (A3). Causal hypergraph visualization 342 indicates that one effect is Significant Productivity Boost (E1), and another effect is Marginal Productivity Boost (E2). Hypothetical probability include: $p1$ (A1→E1)—70% chance that implementing Agile Methodologies will result in a significant productivity boost; $p2$ (A1→E2)—30% chance that implementing Agile Methodologies will only give a marginal boost. Perhaps the team struggles to adapt or there's resistance to change. In another hypothetical probability p3 (A2→E1)—50% chance that Enhancing Training Programs leads to a significant productivity boost. Training can generally increase employees' skills, but it also takes them away from their tasks temporarily; p4 (A2→E2)—50% chance that Enhancing Training Programs results in only a marginal boost in the short term, with hopes of long-term gains; p5 (A3→E1)—60% chance that Improving the Work Environment results in a significant boost in productivity; p6 (A3→E2)—40% chance that the Improving the Work Environment leads to only a marginal increase in productivity.

While FIGS. 2-3 represent the data of the hypergraph database 34 as causal hypergraph visualizations 242, 342, it should be appreciated that the data of the hypergraph database 34 may be represented using other suitable means, such as a computational ontology or taxonomy.

Figure 4:
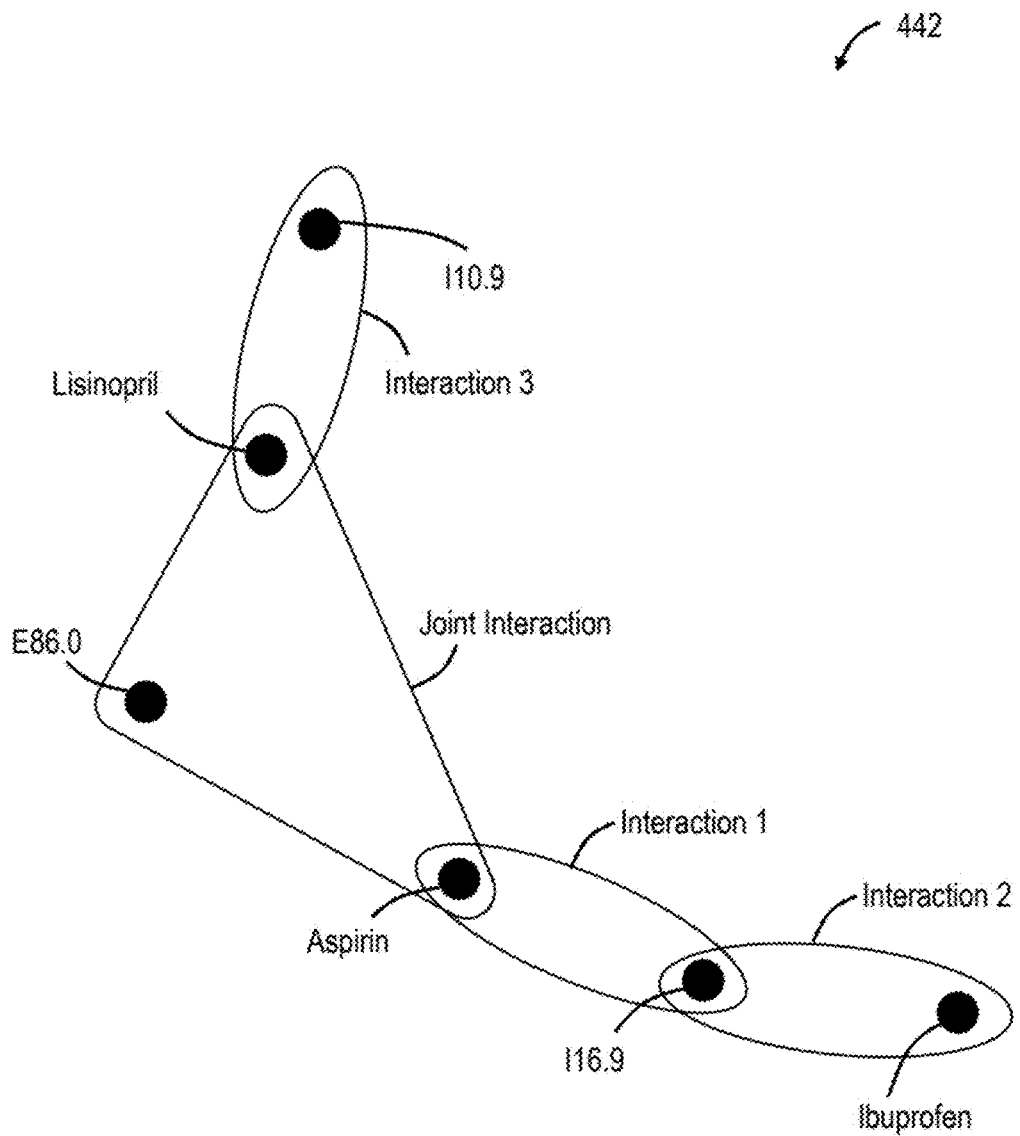
FIG. 4 illustrates an exemplary hypothetical drug interaction scenario, in accordance with aspects of the present subject matter.

Referring now to FIG. 4, a hypothetical drug interaction scenario is illustrated in accordance with aspects of the present subject matter. In the hypothetical drug interaction 442 between the drugs Ibuprofen, Lisinopril, and Aspirin, probabilities are ignored for ease of discussion and illustration. The effects of such drug interactions include Kidney Damage (N17), Reduced BP Efficacy (I10), and Stomach Bleeding (K25.0). FIG. 4 also illustrates a combination of the treatments of Aspirin and Lisinopril Combo.

Figure 5:
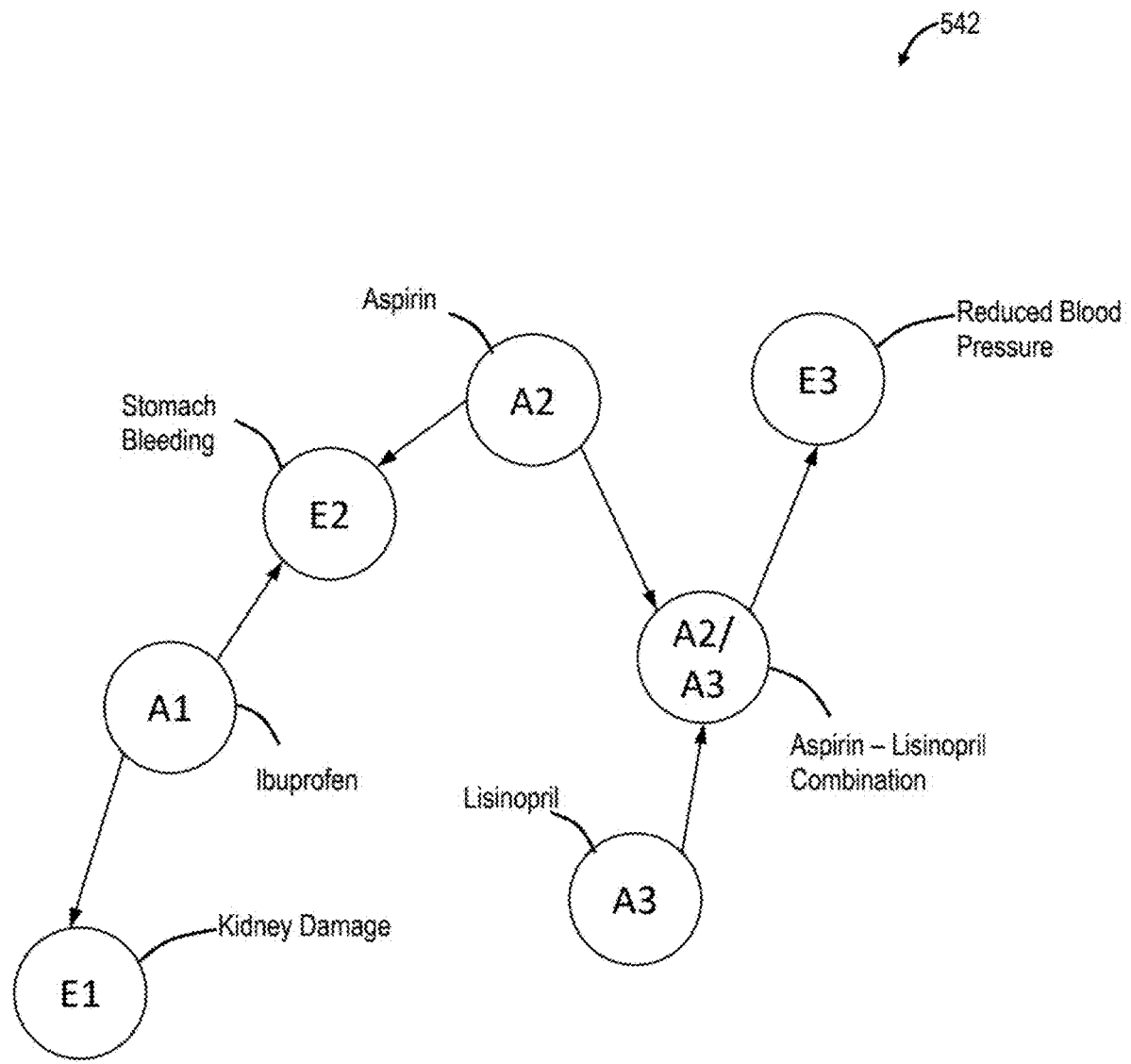
FIG. 5 illustrates a possible interaction scenario of the hypothetical drug interaction scenario of FIG. 4, in accordance with aspects of the present subject matter.
Figure 6:
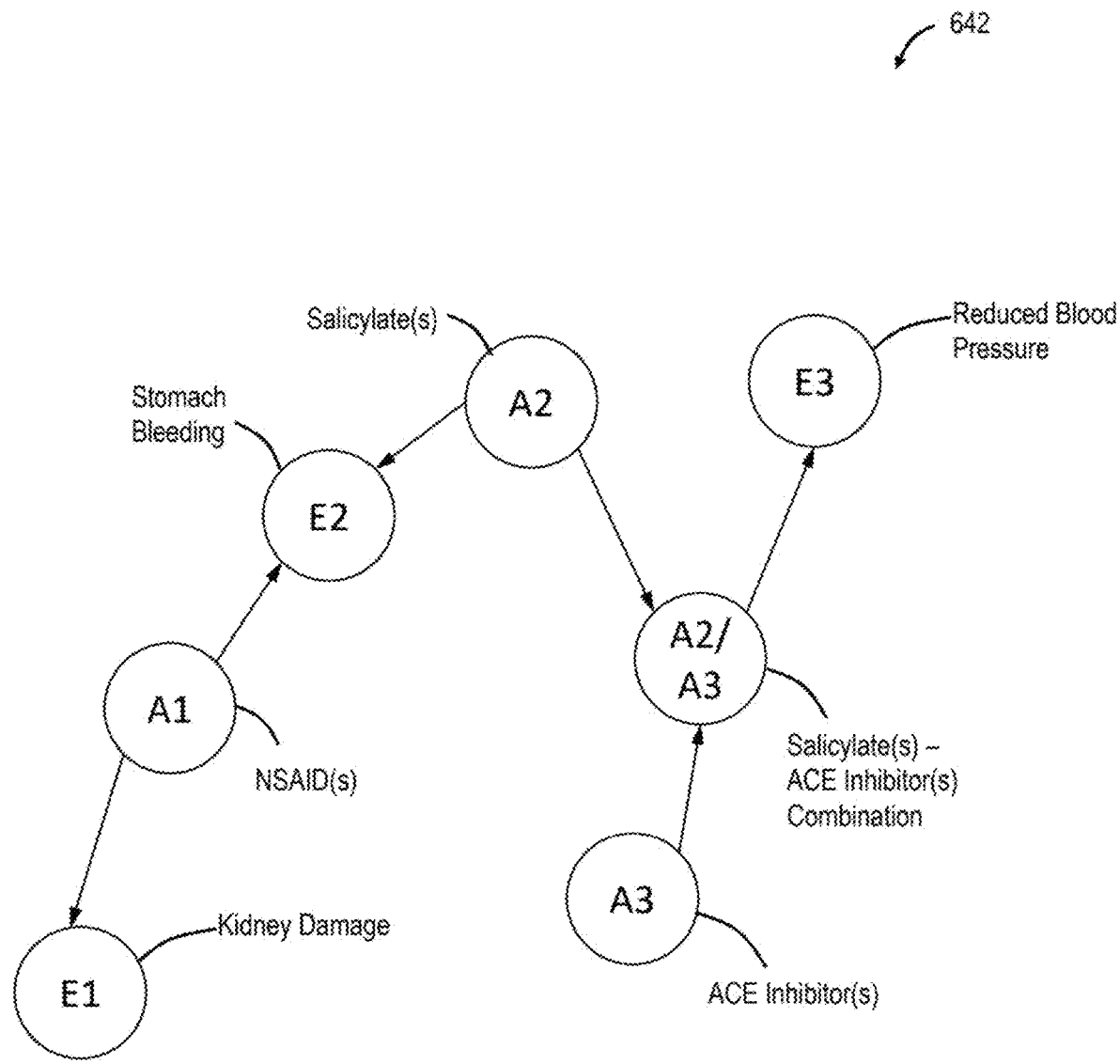
FIG. 6 illustrates a more general representation of the possible interaction scenario of FIG. 5, in accordance with aspects of the present subject matter.

Referring now to FIG. 5, a possible interaction scenario 542 is illustrated showing the associations and causality (direction) of the hypothetical drug interaction scenario 442 of FIG. 4. Referring also to FIG. 6, a more general representation 642 of the possible interaction scenario 542 of FIG. 5 is illustrates using the taxonomic concepts for drugs, where Ibuprofen is identified as belonging to an NSAIDs taxonomy category, Lisinopril is identified as belonging to an ACE Inhibitors' taxonomy category, and Aspirin is identified as belonging to a Salicylates taxonomy category. It should be appreciated that it is also possible to add the UMLS categories: ['NSAIDs (T121)', 'ACE Inhibitors (T121)', 'Salicylates (T121)']; ['Kidney Damage (T047)', 'Reduced BP Efficacy (T047)', 'Stomach Bleeding (T047)']; ['Salicylates & ACE Inhibitors Combo'].

The above examples of FIGS. 2-6 illustrate exemplary causal hypergraph visualizations that may be produced by the system 10 based on hypergraph data in the hypergraph database 34 generated from causal statements included in one or more natural language text files 24. Once such a causal hypergraph visualization has been displayed to the user via the visualization and querying module 18 in combination with the user interface 20, the system 10 may be configured for further user interaction with the resulting causal hypergraph visualization and/or the data or natural language text file(s) 24 on which the causal hypergraph visualization is based. For example, the visualization and querying module 18 in combination with the user interface 20 may receive an indication of a user selected element of the causal hypergraph visualization (e.g., a node, edge, or hyperedge thereof). In response to receiving the selected element of the causal hypergraph visualization, the visualization and querying module 18 in combination with the user interface 20 may generate at least one of a causal link indicated by the selected element, at least one causal statement on which the at least one causal link is based, at least one sentence of the at least one natural language text file on which the at least one causal link is based, or a combination of the preceding.

Some embodiments of the visualization and querying module 18 may implement one or more artificial intelligence algorithms for performing such tasks or associated tasks, as described herein. Various embodiments of the visualization and querying module 18 may utilize a machine learning model such as a deep learning network and/or a graph representation model. In some embodiments, a deep learning network utilized by the visualization and querying module 18 may include a pretrained Faster Regions with Convolutional Neural Network (R-CNN). For example, the deep learning network may produce a scene graph generation (SGG) as a precursor to generating the causal hypergraph visualization element. Thus, and in some embodiments, the deep learning network may include or utilize one or more of Conditional Random Field (CRF)-based SGG, Translation Embedding (TransE)-based SGG, CNN-based SGG, Recurrent Neural Network (RNN)/Long Short-term Memory Network (LSTM)-based SGG, Graph Convolutional Network (GNN)-based SGG, and/or Graph Bridging Network (GB-Net). Some embodiments of the deep learning network may be trained using cross-entropy losses of object labels and predicate labels. Some embodiments of the visualization and querying module 18 and/or the deep learning network utilized therein may be configured to generate a virtual reality user interface and may utilize or include, as non-limiting examples, a Fruchterman-Reingold method for the "force-directed" placement of vertices, a VRNetzer, Worlds-in-Miniature module/algorithm, GraphVR, Unity, Steam VR, HTC Vive, the Unreal Engine, Gephi, Cytoscape, Graphviz, 3D Graph Explorer, and/or the experience Induction Machine.

In some embodiments, the visualization and querying module 18 may be trainable on additional data. For example, the additional data may include visualization training data indicating one or more previously-generated layouts of the hypergraph user interface, such as an arrangement of any generated causal hypergraph visualization element and/or informative element on a display associated with the system 10. Additionally or alternatively, the visualization training data can indicate a user-initiated change to at least one of a previously-generated layout of the hypergraph user interface, a previously-generated layout of the causal hypergraph visualization element, or a previously-generated layout of the informative element. For example, changes of visually accessible and controlled portions of the hypergraph user interface may be learning from previous interactions. In some embodiments, the visualization training data may be utilized to retrain a deep learning network of the visualization and querying module 18 configured to generate the hypergraph user interface and/or components thereof, such as the hypergraph visualization element and/or the informative element.

Furthermore, the visualization and querying module 18 may include at least one module suitable for transfer learning allowing the visualization and querying module 18 to be extended to new domains using machine learning transfer. For example, the visualization and querying module 18 may be trainable on additional data. Thus, the visualization and querying module 18 may be capable of transfer learning when the said additional data requires changes to, for example, the machine learning model, the deep learning network, and/or the graph representation model utilized by or included in the visualization and querying module 18.

The visualization and querying module 18 may be capable of interactively updating the said stored relations in an interactive session through a program. For example, a user may select a portion of the database based, e.g., on searching for nodes and relations, resulting in a hypergraph; may add or remove nodes or links (e.g., edges, directed edges, hyper edges, directed hyper edges, etc.) in the causal hypergraph visualization and data thereof; may change the weights, direction or other information on the links of the said causal hypergraph visualization and data thereof; may analyze a natural language text file and add a new hypergraph to the hypergraph database 34; and/or may retain the machine learning algorithms of the modules 12, 14, 16, 18, and/or the components thereof.

Embodiments of the system 10 may further be configured for enabling transferring one or more of the model/modules and association programs described herein to a new domain or new data in the same domain. For example, the system 10 may enable transferring model(s) to new data in the same domain. In such a situation the visualization and querying module 18 may only show part of the hypergraph database (e.g., a nested causal hypergraph or graph visualization) representing the new data to the user for interaction and interpretation.

Embodiments of the system 10 may additionally or alternatively include a transfer module including one or more classifiers in the original domain and one or more classifiers in the target domain. For example, one or more of the said classifiers may produce annotations based on one or more stakeholder taxonomies. In some embodiments, the transfer module may include a submodule for using few-shot learning to predict the unlabeled data from the labeled data. The transfer module may generally be suitable for transfer leaning and/or application to new domains using machine learning transfer. For example, various of the modules described herein may be trainable on additional data. For example, the modules may be capable of transfer learning when the additional data requires changes to one or more of the language model, ontology model, and/or graph representation model. One of the typical transfer scenarios is changing of domains, for example from business, say organizational performance, to medicine (say, medical treatment guidelines). Another typical scenario is changing the hypergraph based on strengths of the connections or other factors (e.g. removing data from finance when analyzing healthcare). Some embodiments of the system 10 and/or transfer module may include one or more modules for checking domain adaptability for transfer learning.

It should be appreciated that the hypergraph, the included graph(s) and hypergraphs, and/or the hypergraph data may be manipulated by a person or machine. For instance, the system 10 may be connected to an external simulation system, e.g., to get more insight through system dynamics. As another example, the system 10 may be integrated or communicatively coupled to an investment machine. If such an investment machine has analysis software, the investment machine may make investment decisions with or without human input and based on the hypergraph database 34 and/or the causal hypergraph visualizations disclosed herein. In the context of medical treatment, the system 10 may enable real-time checks on what is happening with a patient. A machine implementing system 10 can act as an expert, e.g., with respect to what medications nurse(s) can/cannot give, which can be incorporated into their hypergraph visualization and/or data to use as a physician assistant. It should be appreciated that cases often serve as prototypes of treatment. Within any hypergraph visualization and/or the hypergraph database 34 utilized in such contexts, links to guideline should be linked, and information from a case should be separated. Thus, embodiments of the system 10 may take info from publications and try to arrange to facilitate a medical decision making. Outputs in such a situation may include courses of actions/treatments. Some embodiments of the system 10 may be included or integrated into multimodal and/or multisensor medical devices.

The present disclosure is also related to the user interface 20 for interacting with the rest of the system 10. In some embodiments, the user interface 20 may include at least one of a hypergraph user interface, a graphical user interface, a virtual reality user interface, a multimodal visual user interface, or a haptic user interface for interaction with the system 10 for integrative causal modeling from natural language text. As described above with respect to FIG. 1, the system 10 may receive input 22 including the natural language text file(s) 24 via the user interface 20 and generate a causal hypergraph visualization as described generally above with respect to FIGS. 2-6 (e.g., visualizations 242, 342, 442, 542, and/or 642).

Figure 7:
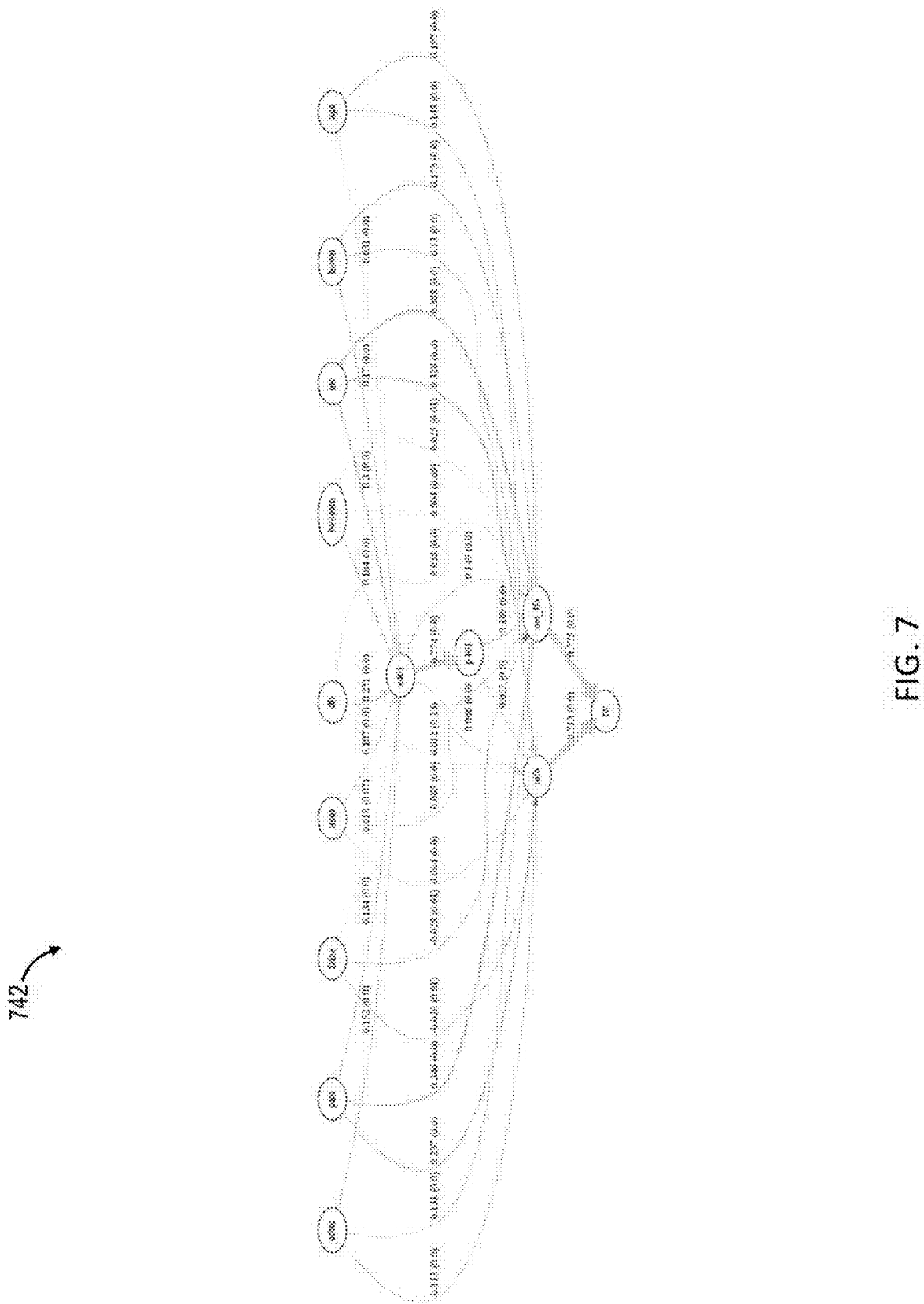
FIG. 7 illustrates an exemplary embodiment of a causal hypergraph visualization, in accordance with aspects of the present subject matter.
Figure 8:
FIG. 8 illustrates a schematic diagram of an exemplary embodiment of a first-order visualization of a causal hypergraph, in accordance with aspects of the present subject matter.
Figure 8:
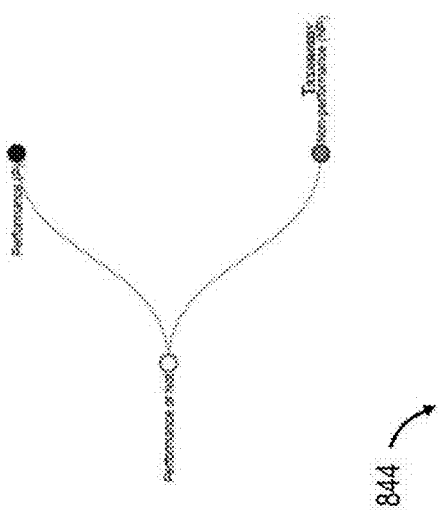
Figure 9:
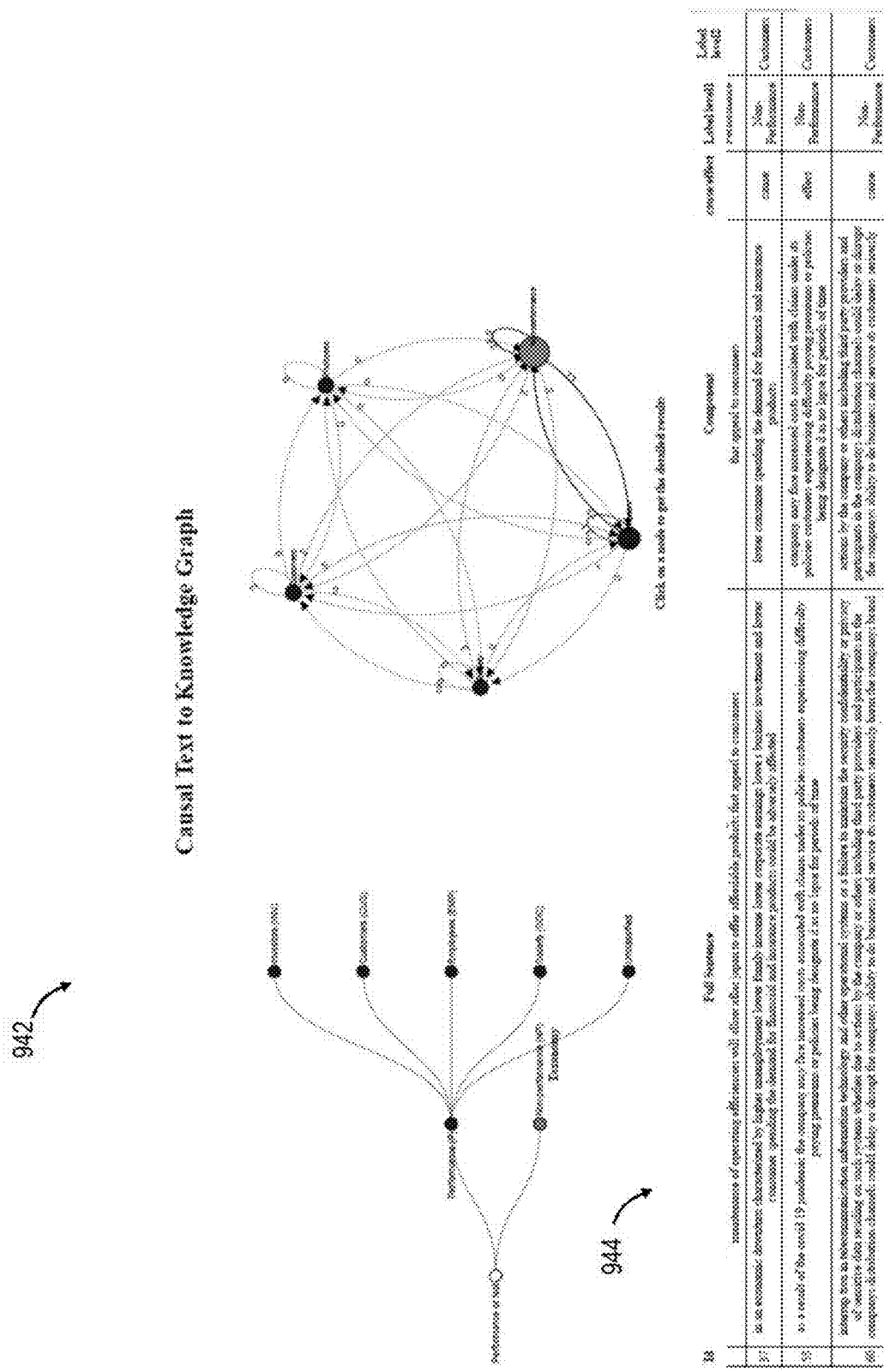
FIG. 9 illustrates a schematic diagram of an exemplary embodiment of a second-order visualization of a causal hypergraph, in accordance with aspects of the present subject matter.
Figure 10:
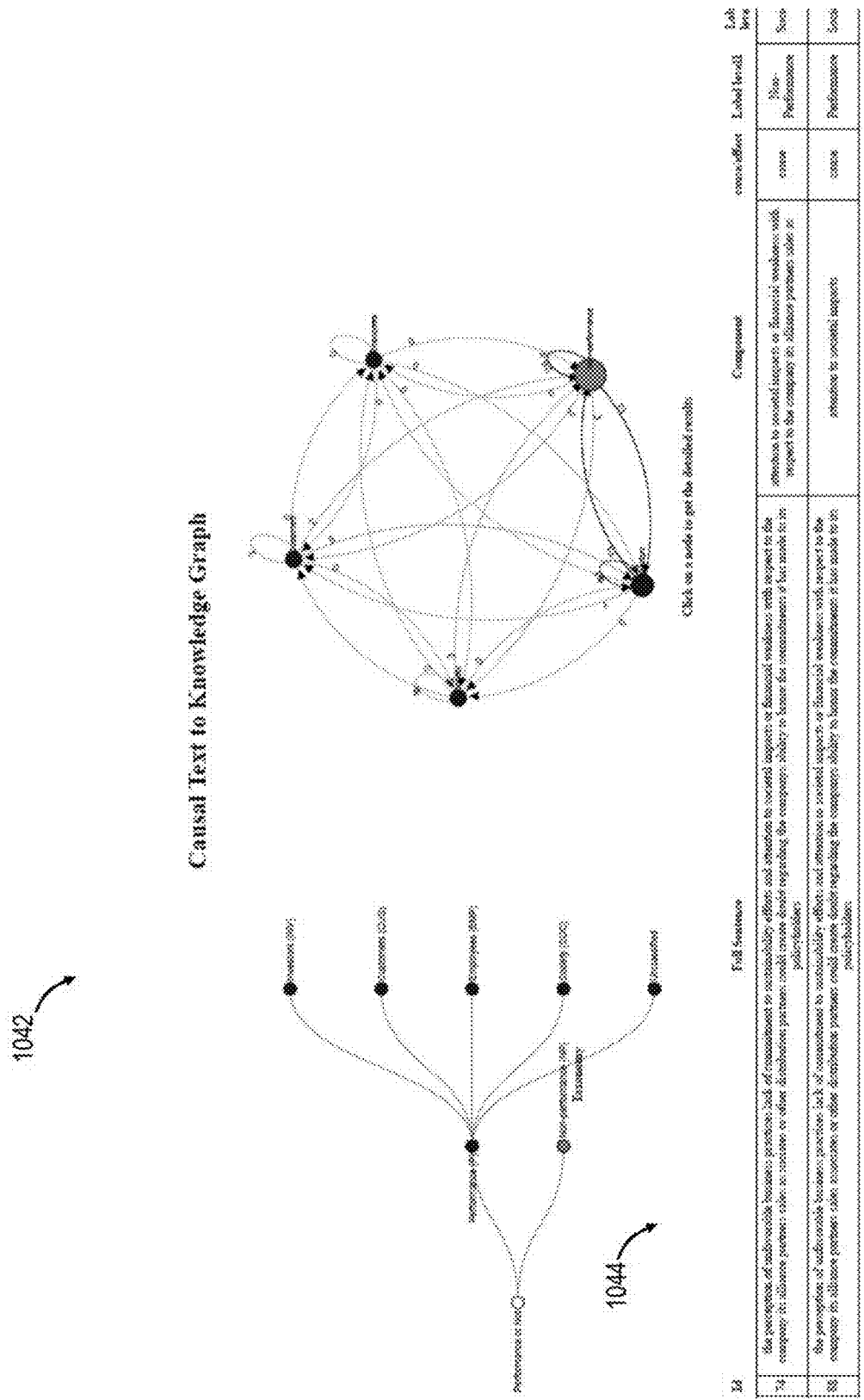
FIG. 10 illustrates a schematic diagram of another exemplary embodiment of a second-order visualization of a causal hypergraph with a user selected node, in accordance with aspects of the present subject matter.
Figure 11:
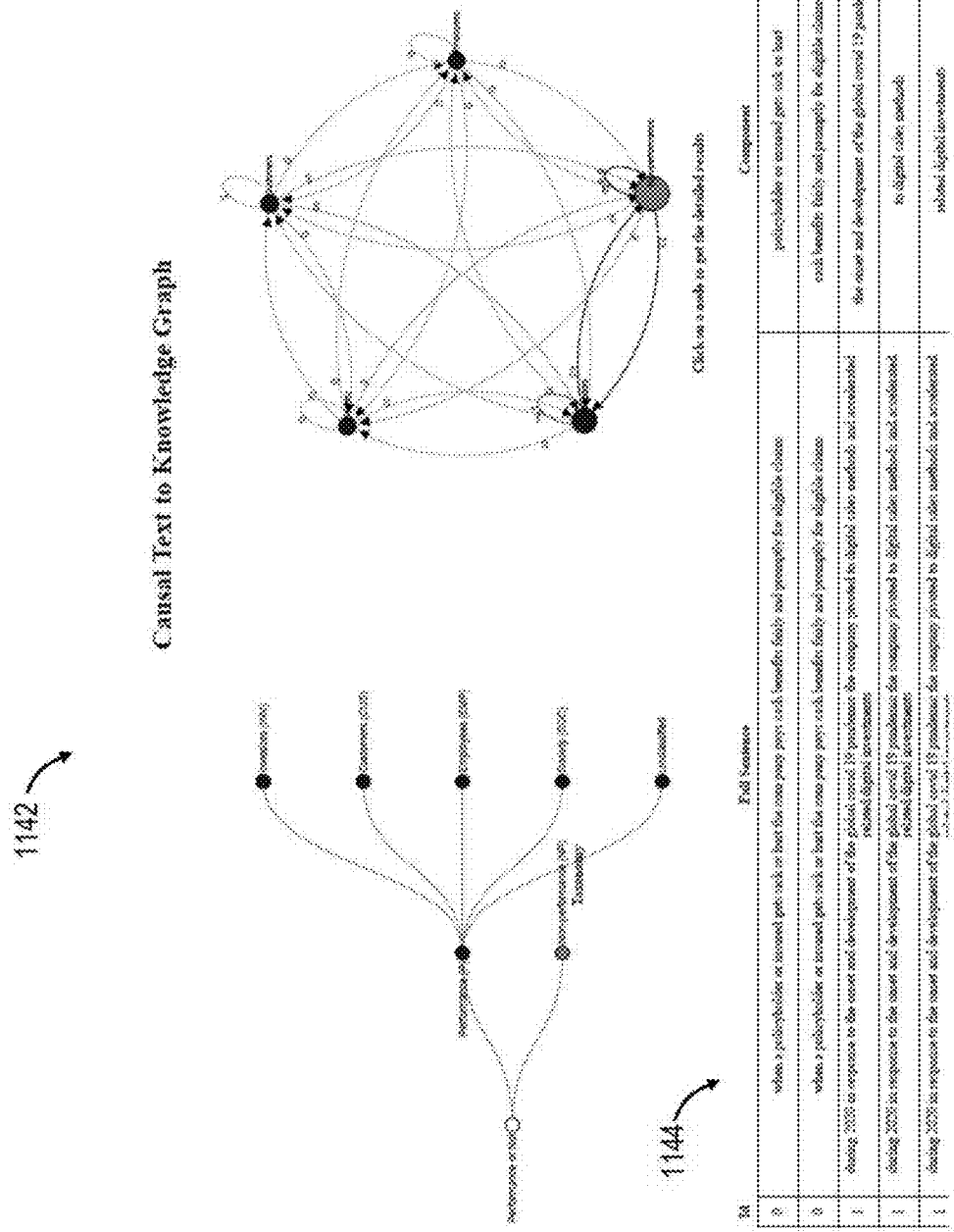
FIG. 11 illustrates a schematic diagram of another exemplary embodiment of a second-order visualization of a causal hypergraph with a different user selected node, in accordance with aspects of the present subject matter.
Figure 12:
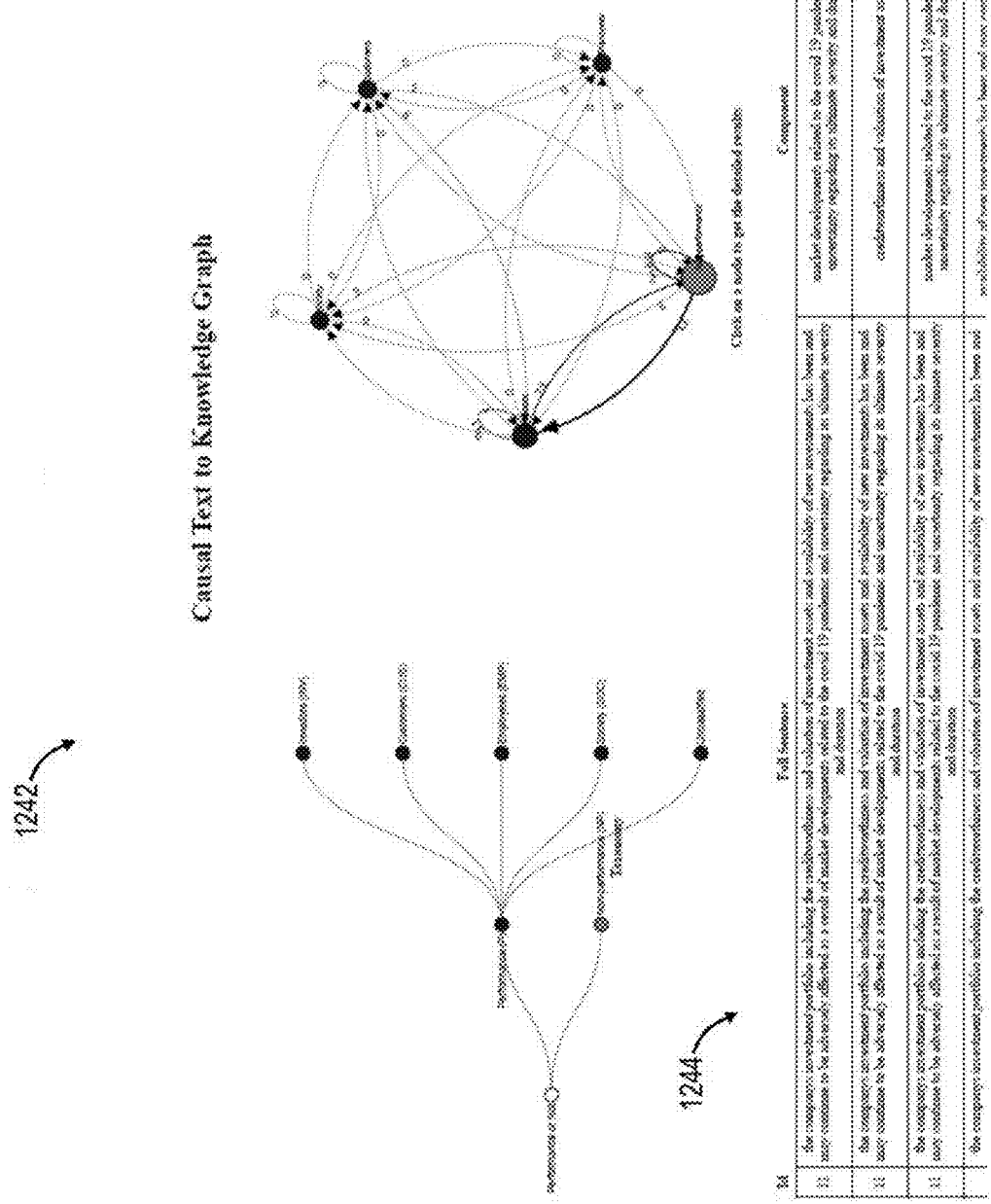
FIG. 12 illustrates a schematic diagram of another exemplary embodiment of a second-order visualization of a causal hypergraph with a user selected edge, in accordance with aspects of the present subject matter.
Figure 13:
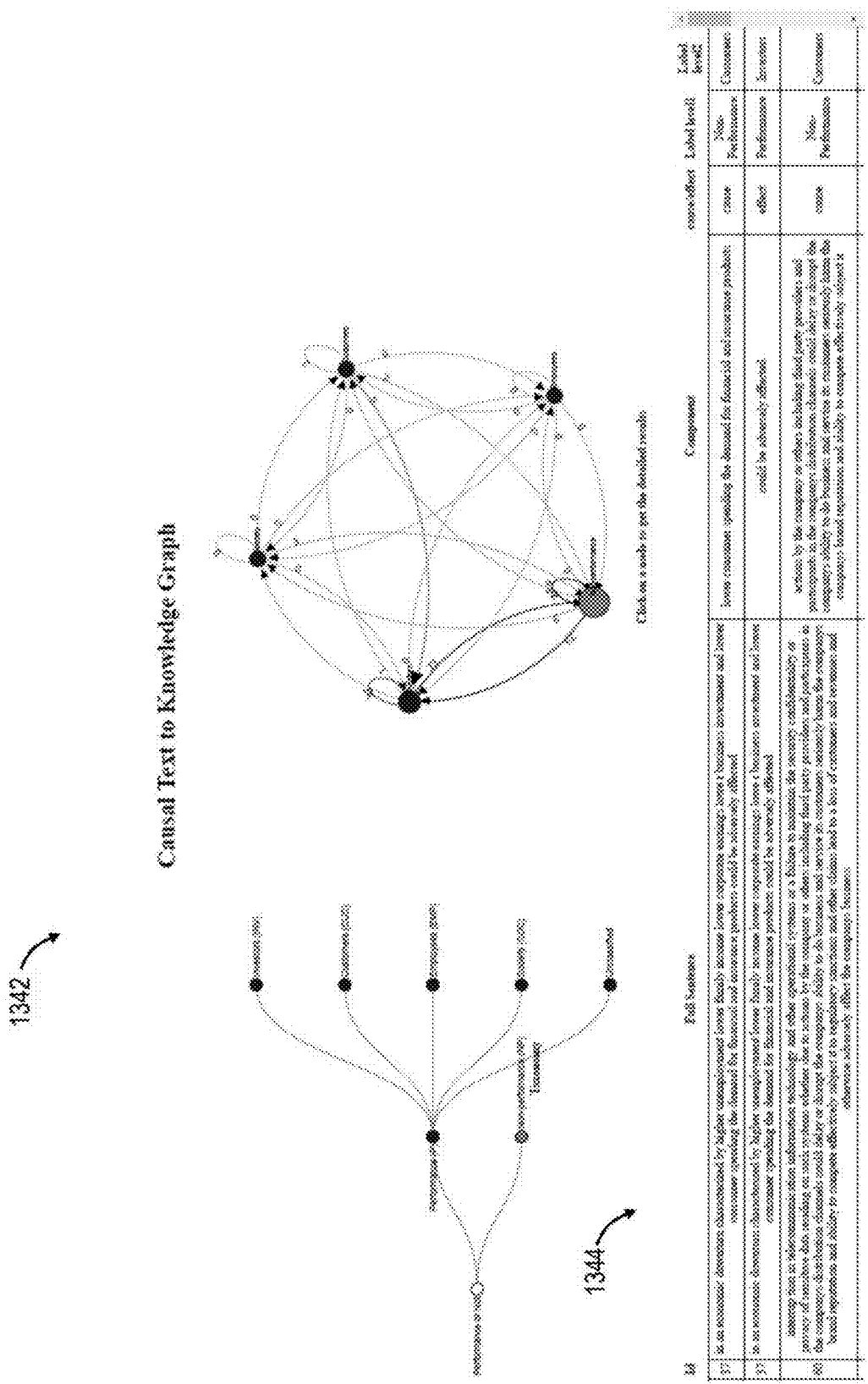
FIG. 13 illustrates a schematic diagram of another exemplary embodiment of a second-order visualization of a causal hypergraph with a different user selected edge, in accordance with aspects of the present subject matter.

Referring now to FIG. 7, an exemplary embodiment of a causal hypergraph visualization is illustrated in accordance with aspects of the present subject matter. It should be appreciated that the casual hypergraph visualization 742 may be produced via the hypergraph user interface 20 including or configured as one or more of a graphical user interface, a virtual reality user interface, a multimodal visual user interface, or a haptic user interface. As shown, the casual hypergraph visualization 742 represents a knowledge graph of a more complex situation than those illustrated in FIGS. 2-6.

In some embodiment and as illustrated, each link (edge and/or hyperedge) connects at least one node associated with a taxonomy category to at least one other node, e.g., a plurality of links indicating multivariable, directed hypergraph data. For instance, in FIG. 7 "nifa" may indicate causal link portions associated with net non-401 (k) assets; "net_tfa" may indicate causal link portions associated with net financial assets; "tw" may indicate causal link portions associated with total wealth; "age" may indicate causal link portions associated with age; "inc" may indicate causal link portions associated with income; "fsize" may indicate causal link portions associated with family size; "edu" may indicate causal link portions associated with years of education; "db" may indicate causal link portions associated with defined benefit pension; "marr" may indicate causal link portions associated with marriage; "twoearn" may indicate causal link portions associated with both earning jobs; "e401" may indicate causal link portions associated with 401 (k) eligibility; "p401" may indicate causal link portions associated with 401 (k) participation; "pira" may indicate causal link portions associated with IRA participation; and "home" may indicate causal link portions associated with home ownership.

In the embodiment of FIG. 7, the label of each link, representing one or more directed edges or hyper edges, shows the mean effect size (e.g., a p-value in parenthesis). The arrow of each link shows the direction of causality, and a color of each link indicates the whether the causality is positive (e.g., a green link) or negative (e.g., a red link). In various embodiments and as illustrated, a line thickness of each link may indicate a magnitude of the causal effect size.

As shown in visualization 742, when the directed hypergraph database 32 includes multivariable hypergraph data, at least one hypergraph element of the casual hypergraph visualization 742 indicates multivariable, directed causality. As shown, the causal hypergraph visualization 742 includes a plurality of links (directed edges) connecting two or more nodes of the plurality of nodes. At least one start of each link is connected a start node and indicating a causal portion of a causal statement indicated by the link and associated with the start node, and at least one target of each link connects to a target node and indicating a target (output) portion of the causal statement indicated by the link and associated with the target node.

The system 10, querying and visualization module 18, and/or user interface 20 (configured as a hypergraph user interface), allow for different hypergraphs visualizations based on complexity of the hypergraphs visualizations and/or hypergraph data in the hypergraph database 32. For instance, it can be appreciated that visualization 742 of FIG. 7 may be complete but hard to understand due to the number of contained links. Thus, cause-effect hypergraphs can be nested to ease understanding and/or different graphs with their own taxonomy may be utilized to represent the integrative causal hypergraph, e.g., such that the different graphs may be combined into the one integrative causal hypergraph. Such hypergraph nesting and/or segregation allows for more relationship and interplay visualizations. Some embodiments of the system 10 may be configured for producing one or more bipartite graphs indicating the directed hypergraph data.

Referring now to FIGS. 8-13, embodiments of nested hypergraph visualizations 842, 942, 1042, 1142, 1242, and 1342 are illustrated in accordance with aspects of the present subject matter. It should be appreciated that the casual hypergraph visualization 842, 942, 1042, 1142, 1242, and/or 1342 may be produced via the hypergraph user interface 20 including or configured as one or more of a graphical user interface, a virtual reality user interface, a multimodal visual user interface, or a haptic user interface. As shown in FIGS. 8-13, the hypergraph data may be represented by two graphs side-by-side. However, other arrangements are contemplated, e.g., top-bottom, pop-up graphs, etc. The left graph in the illustrated embodiments may be a nodal diagraph representing the predefined taxonomy categories and/or the portions/segments of the causal statements identified as performance or non-performance. The right-side graph of the illustrated embodiments may include a representation of a hypergraph and/or a sub-graph or nested graph thereof. In some embodiments, the right side may be a directed (causal) graph, and a combination of the representations (e.g., directed graphs) generated from the each of the selectable nodes from the right-side graph may result in integrative causal hypergraph visualization as described herein. In the illustrated embodiments, one or more taxonomy categories may be associated with one or more stakeholders or key performance indicator of a business association. For example and as shown, the predefined taxonomy categories may include customers, employees, investors, or society (e.g., community or environment).

As shown particularly in visualization 842, the visualization 842 of the hypergraph data may allow for the user to select a first-order representation of the hypergraph data such that each included edge (link) only connects two nodes. In the example here, the causal hypergraph visualization 842 includes a first-order nodal diagram. The first-order nodal diagram includes a performance node representing the nodes of the directed hypergraph data associated with the taxonomy categories and a non-performance node representing one or more portions of causal links not associated with at least one of the taxonomy categories. It should be noted that, for the hypergraph data utilized to generate the visualizations of FIGS. 8-13, non-performance issues may generally have some effect, such as a large effect, on one or more of the portions of the causal statements associated with the predefined taxonomy categories.

By selecting one of the nodes or edges (links) of the visualization 842, a second-order representation of the hypergraph data may be generated via the hypergraph user interface 20, as shown in FIGS. 1 and 9-13. For example, the hypergraph user interface 20 may be configured to generate, in response to a selection of one of the performance node or the non-performance node, a second-order causal hypergraph visualization element including nodes associated with the selected node of the first-order nodal diagram.

As shown, the second-order representations of the hypergraph data within the causal hypergraph visualizations 942-1342 each includes at least one hypergraph element indicative of second-order causality (e.g., a directed hyperedge) when the directed hypergraph data includes second order, directed hypergraph data. For example, the right graph of each of visualizations 942-1342 includes multiple nodes, one node associated with of the predefined taxonomy categories.

As shown, each link (e.g., directed edge) may include an indicator indicative of at least one of a number of causal links associated with the directed edge, the strength of a causal association of at least one causal link associated with the directed edge, or a strength of the association between at least one of the connected nodes and at least one causal links associated with the directed edge. In the illustrated embodiments, the links (edges, directed edges, hyperedges, directed hyper edges) show the number labels or causal links included therein, and clicking on a link shows the included causal links. The size of a node of the visualization may additionally or alternatively be proportional to the number of links associated with the node. In some embodiments, a thickness, color, style, or the like of one or more of the edges may indicate the strength of the causal association of at least one causal link represented by the edge, such as the strongest causal association or an average causal association of the causal links. In a simple case, the indicator(s) may be the weight of the connection or a string representing the name of the relationship between nodes. In another embodiment, the indicator(s) may be a vector of values of different types (e.g. strings representing provenance and numbers representing probabilities or strength of associations between the nodes); in the most general case the indicator may be based on a collection of records (as in a database) or tensor of representation of such records.

In some embodiments and in response to the selection of an element of the causal hypergraph visualization, the hypergraph user interface 20 may be configured to reorient the respective casual hypergraph visualization element to emphasize the selected element or otherwise draw attention the selected element (e.g., increase the size of the selected element, change the color of the selected element, or the like). For instance and as illustrated in the visualization 1242 of FIG. 12, selection of the edge connecting the non-performance node to the investors node causes the selected edge to be enlarged (see also selected edge connecting the customers node to the investor node in the visualization 1342 of FIG. 13).

In some embodiments, selection of an element of the visualizations may cause the hypergraph user interface 20 to communicate an indication of the selected visualization element to the visualization and querying module 18 of the system 10. In response, the visualization and querying module 18 in combination with the hypergraph user interface 20 may cause an informative element (see informative tables 844, 944, 1044, 1144, 1244, and 1344 of FIGS. 8-13, respectively) to be generated on a display associated with the system 10. The informative table(s) 844, 944, 1044, 1144, 1244, and 1344 may be configured as a table or chart displayed in association with the respective visualizations and indicative of at least one of a causal link, a causal statement, the level(s) of causality, or a sentence of the at least one natural text file on which the selected hypergraph element is based.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 14:
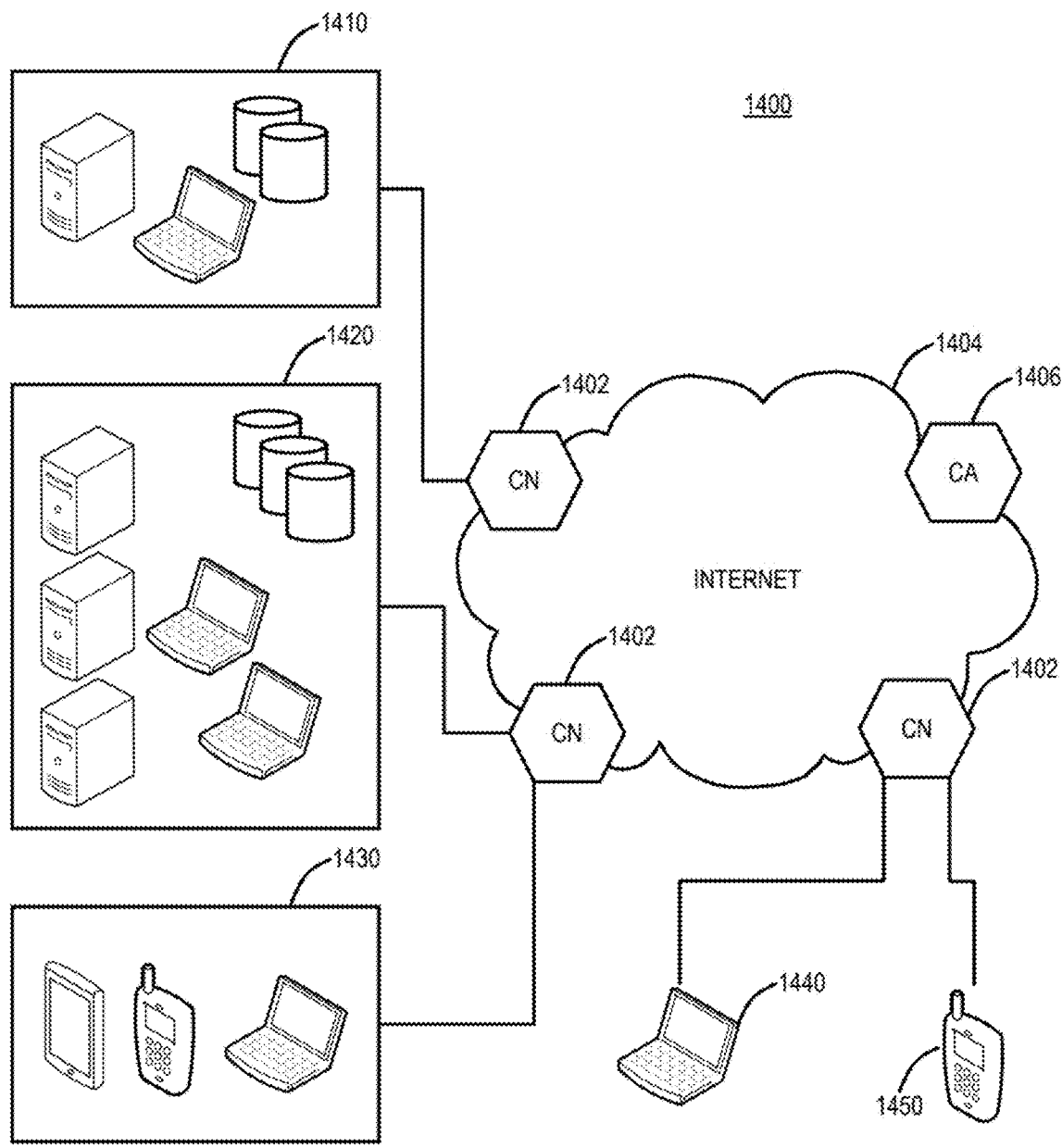
FIG. 14 illustrates a schematic diagram of an exemplary embodiment of a network of a cloud-based system for implementing various cloud-based services, in accordance with aspects of the present subject matter.
Figure 15:
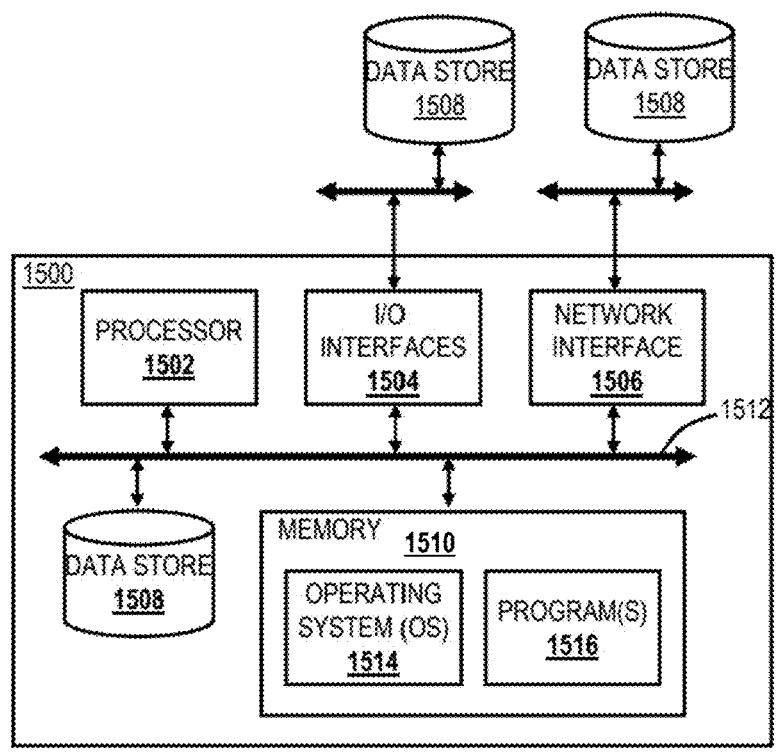
FIG. 15 illustrates a schematic diagram of an exemplary embodiment of a server which may be used in the cloud-based system of FIG. 15 or stand-alone, in accordance with aspects of the present subject matter.

FIG. 14 is a network diagram of a cloud-based system 1400 for implementing various cloud-based services of the present disclosure. The cloud-based system 1400 includes one or more cloud nodes (CNs) 1402 communicatively coupled to the Internet 1404 or the like. The cloud nodes 1402 may be implemented as a server 1500 (as illustrated in FIG. 15) or the like and can be geographically diverse from one another, such as located at various data centers around the country or globe. Further, the cloud-based system 1400 can include one or more central authority (CA) nodes 1406, which similarly can be implemented as the server 1500 and be connected to the CNs 1402. For illustration purposes, the cloud-based system 1400 can connect to a regional office 1410, headquarters 1420, various employee's homes 1430, laptops/desktops 1440, and mobile devices 1450, each of which can be communicatively coupled to one of the CNs 1402. These locations 1410, 1420, and 1430, and devices 1440 and 1450 are shown for illustrative purposes, and those skilled in the art will recognize there are various access scenarios to the cloud-based system 1400, all of which are contemplated herein. The devices 1440 and 1450 can be so-called road warriors, i.e., users off-site, on-the-road, etc. The cloud-based system 1400 can be a private cloud, a public cloud, a combination of a private cloud and a public cloud (hybrid cloud), or the like.

Again, the cloud-based system 1400 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 1410, 1420, and 1430 and devices 1440 and 1450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 1400 is replacing the conventional deployment model. The cloud-based system 1400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 1400 is illustrated herein as one example embodiment of a cloud-based system, and those of ordinary skill in the art will recognize the systems and methods described herein are not necessarily limited thereby.

FIG. 15 is a block diagram of a server 1500, which may be used in the cloud-based system 1400 (FIG. 14), in other systems, or stand-alone. For example, the CNs 1402 (FIG. 14) and the central authority nodes 1406 (FIG. 14) may be formed as one or more of the servers 1500. The server 1500 may be a digital computer that, in terms of hardware architecture, generally includes a processor 1502, input/output (I/O) interfaces 1504, a network interface 1506, a data store 1508, and memory 1510. It should be appreciated by those of ordinary skill in the art that FIG. 15 depicts the server 1500 in an oversimplified manner, and a practical embodiment may include additional components and suitably configured processing logic to support known or conventional operating features that are not described in detail herein. The components (1502, 1504, 1506, 1508, and 1510) are communicatively coupled via a local interface 1512. The local interface 1512 may be, for example, but is not limited to, one or more buses or other wired or wireless connections, as is known in the art. The local interface 1512 may have additional elements, which are omitted for simplicity, such as controllers, buffers (caches), drivers, repeaters, and receivers, among many others, to enable communications. Further, the local interface 1512 may include address, control, and/or data connections to enable appropriate communications among the aforementioned components.

The processor 1502 is a hardware device for executing software instructions. The processor 1502 may be any custom made or commercially available processor, a central processing unit (CPU), an auxiliary processor among several processors associated with the server 1500, a semiconductor-based microprocessor (in the form of a microchip or chipset), or generally any device for executing software instructions. When the server 1500 is in operation, the processor 1502 is configured to execute software stored within the memory 1510, to communicate data to and from the memory 1510, and to generally control operations of the server 1500 pursuant to the software instructions. The I/O interfaces 1504 may be used to receive user input from and/or for providing system output to one or more devices or components.

The network interface 1506 may be used to enable the server 1500 to communicate on a network, such as the Internet 1404 (FIG. 14). The network interface 1506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 1506 may include address, control, and/or data connections to enable appropriate communications on the network. A data store 1508 may be used to store data. The data store 1508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1508 may incorporate electronic, magnetic, optical, and/or other types of storage media. In one example, the data store 1508 may be located internal to the server 1500, such as, for example, an internal hard drive connected to the local interface 1512 in the server 1500. Additionally, in another embodiment, the data store 1508 may be located external to the server 1500 such as, for example, an external hard drive connected to the I/O interfaces 1504 (e.g., a SCSI or USB connection). In a further embodiment, the data store 1508 may be connected to the server 1500 through a network, such as, for example, a network-attached file server.

The memory 1510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1510 may incorporate electronic, magnetic, optical, and/or other types of storage media. Note that the memory 1510 may have a distributed architecture, where various components are situated remotely from one another but can be accessed by the processor 1502. The software in memory 1510 may include one or more software programs, each of which includes an ordered listing of executable instructions for implementing logical functions. The software in the memory 1510 includes a suitable operating system (O/S) 1514 and one or more programs 1516. The operating system 1514 essentially controls the execution of other computer programs, such as the one or more programs 1516, and provides scheduling, input-output control, file and data management, memory management, and communication control and related services. The one or more programs 1516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 16:
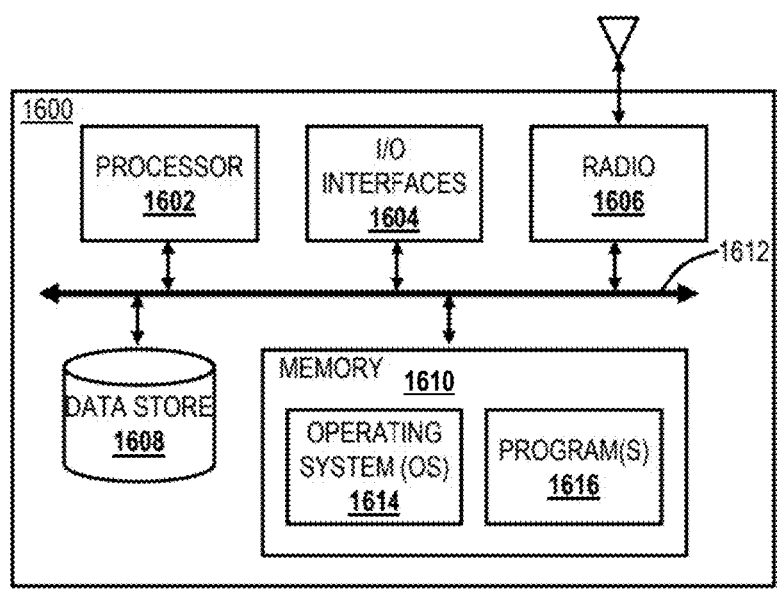
FIG. 16 illustrates a schematic diagram of an exemplary embodiment of a user device which may be used in the cloud-based system of FIG. 14 or stand-alone, in accordance with aspects of the present subject matter.

FIG. 16 is a block diagram of a user device 1600, which may be used in the cloud-based system 1400 (FIG. 14), as part of a network, or stand-alone. Again, the user device 1600 can be a vehicle (e.g., one or more control units thereof), a smartphone, a tablet, a smartwatch, an Internet of Things (IOT) device, a laptop, a virtual reality (VR) headset, etc. The user device 1600 can be a digital device that, in terms of hardware architecture, generally includes a processor 1602, I/O interfaces 1604, a radio 1606, a data store 1608, and memory 1610. It should be appreciated by those of ordinary skill in the art that FIG. 16 depicts the user device 1600 in an oversimplified manner, and a practical embodiment may include additional components and suitably configured processing logic to support known or conventional operating features that are not described in detail herein. The components (1602, 1604, 1606, 1608, and 1610) are communicatively coupled via a local interface 1612. The local interface 1612 can be, for example, but is not limited to, one or more buses or other wired or wireless connections, as is known in the art. The local interface 1612 can have additional elements, which are omitted for simplicity, such as controllers, buffers (caches), drivers, repeaters, and receivers, among many others, to enable communications. Further, the local interface 1612 may include address, control, and/or data connections to enable appropriate communications among the aforementioned components.

The processor 1602 is a hardware device for executing software instructions. The processor 1602 can be any custom made or commercially available processor, a CPU, an auxiliary processor among several processors associated with the user device 1600, a semiconductor-based microprocessor (in the form of a microchip or chipset), or generally any device for executing software instructions. When the user device 1600 is in operation, the processor 1602 is configured to execute software stored within the memory 1610, to communicate data to and from the memory 1610, and to generally control operations of the user device 1600 pursuant to the software instructions. In an embodiment, the processor 1602 may include a mobile optimized processor such as optimized for power consumption and mobile applications. The I/O interfaces 1604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 1606 enables wireless communication to an external access device or network. Any number of suitable wireless data communication protocols, techniques, or methodologies can be supported by the radio 1606, including any protocols for wireless communication. The data store 1608 may be used to store data. The data store 1608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1608 may incorporate electronic, magnetic, optical, and/or other types of storage media.

Again, the memory 1610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1610 may incorporate electronic, magnetic, optical, and/or other types of storage media. Note that the memory 1610 may have a distributed architecture, where various components are situated remotely from one another, but can be accessed by the processor 1602. The software in memory 1610 can include one or more software programs, each of which includes an ordered listing of executable instructions for implementing logical functions. In the example of FIG. 16, the software in the memory 1610 includes a suitable operating system 1614 and programs 1616. The operating system 1614 essentially controls the execution of other computer programs and provides scheduling, input-output control, file and data management, memory management, and communication control and related services. The programs 1616 may include various applications, add-ons, etc. configured to provide end user functionality with the user device 1600. For example, example programs 1616 may include, but not limited to, a web browser, social networking applications, streaming media applications, games, mapping and location applications, electronic mail applications, financial applications, and the like. In a typical example, the end-user typically uses one or more of the programs 1616 along with a network, such as the cloud-based system 1400 (FIG. 14).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A hypergraph user interface for interaction with a system for integrative causal modeling from natural language text, the hypergraph user interface comprising:
 a natural language text input element configured to receive at least one of a designation of a natural language text file or a natural language text file and, in response to the received at least one designation or natural language text file, cause the at least one designation or natural language text file to be communicated to at least one natural language processing module of the system; and
 a causal hypergraph visualization element representative of directed hypergraph data generated from the at least one natural language processing module of the system, wherein, in response to selection of a hypergraph element of the causal hypergraph representation, the hypergraph user interface is configured to communicate an indication of the hypergraph element to a querying module of the system and generate, in association with the causal hypergraph visualization, an informative element indicative of at least one of a causal link, a causal statement, or a sentence of the at least one natural text file on which the hypergraph element is based.

2. The hypergraph user interface of claim 1, wherein, when the directed hypergraph data includes multivariable hypergraph data, at least one hypergraph element of the casual hypergraph visualization indicates multivariable, directed causality.

3. The hypergraph user interface of claim 1, wherein the at least one natural language processing module of the system includes at least one module suitable for transfer learning.

4. The hypergraph user interface of claim 1, wherein, in response to the selection of the hypergraph element, the hypergraph user interface is configured to reorient the casual hypergraph visualization element to emphasize the selected hypergraph element.

5. The hypergraph user interface of claim 1, wherein the informative element includes at least one of a table or chart.

6. The hypergraph user interface of claim 1, wherein the causal hypergraph visualization element includes a plurality of nodes associated with a plurality of taxonomy categories.

7. The hypergraph user interface of claim 6, wherein the causal hypergraph visualization element includes a plurality of directed edges connecting two or more nodes of the plurality of nodes, wherein each directed edge includes an indicator indicative of at least one of a number of causal statements associated with the directed edge, the strength of a causal association of at least one causal statement associated with the directed edge, or a strength of the association between at least one of the connected nodes and at least one casual statement associated with the directed edge.

8. The hypergraph user interface of claim 6, wherein the causal hypergraph visualization element includes a first-order nodal diagram, wherein the first-order nodal diagram includes a performance node representing the nodes of the directed hypergraph data associated with the taxonomy categories and a non-performance node representing one or more portions of causal statements not associated with at least one of the taxonomy categories.

9. The hypergraph user interface of claim 8, wherein the hypergraph user interface is configured to generate, in response to a selection of one of the performance node or the non-performance node, a second-order causal hypergraph visualization element including nodes associated with the selected node of the first-order nodal diagram.

10. The hypergraph user interface of claim 9, wherein the second-order causal hypergraph visualization element includes a plurality of edges, each edge connecting at least one node associated with a taxonomy category to at least one other node, the plurality of edges indicating multivariable, directed hypergraph data.

11. The hypergraph user interface of claim 1, wherein the hypergraph user interface is configured such that at least one of a layout of the hypergraph user interface including at least one of the causal hypergraph visualization element or the informative element or a user-initiated change in the at least one of the causal hypergraph visualization element or the informative element is provided as visualization training data to a visualization module configured to generate the causal hypergraph visualization element or the informative element.

12. The hypergraph user interface of claim 11, wherein the visualization module comprises a deep learning network, and wherein the visualization training data is utilized to train the deep learning network.

13. A system for integrative causal modeling from natural language text, the system comprising:

a causal identification module comprising instructions stored in at least one memory and executable by one or more processors to cause the causal identification module to identify, from at least one natural language text file, a plurality of causal links utilizing natural language processing, each causal link including a causal portion and an output portion;

a normalization module comprising instructions stored in at least one memory and executable by one or more processors to cause the normalization module to identify whether each causal portion and each output portion of each causal link is associated with a taxonomy category of a plurality of predefined taxonomy categories; and a visualization and querying module comprising instructions stored in at least one memory and executable by one or more processors to cause the visualization and querying module to generate a causal hypergraph visualization utilizing interface hardware associated with the system, the causal hypergraph visualization generated from directed hypergraph data representing the causal statements and associations with the predefined taxonomy categories of the at least one natural language text file.

14. The system of claim 13, wherein the visualization and querying module further comprising instructions stored in the at least one memory and executable by the one or more processors to cause the visualization and querying module to:

receive a selection of an element of the causal hypergraph visualization; and generate, in response to the selected element of the causal hypergraph visualization, at least one of a causal link indicated by the selected element, at least one causal statement on which the at least one causal link is based, at least one sentence of the at least one natural language text file on which the at least one causal link is based, or a combination of the preceding.

15. The system of claim 13, wherein the causal identification module further comprising instructions stored in the at least one memory and executable by the one or more processors to cause the causal identification module to:

receive the at least one natural language text file; and identify a plurality of causal statements included in the at least one natural language text file utilizing natural language processing, wherein the casual links are identified from the identified plurality of causal statements.

16. The system of claim 13, wherein the visualization and querying module further comprising instructions stored in the at least one memory and executable by the one or more processors to cause the visualization and querying module to:

generate the causal hypergraph visualization utilizing at least one of a haptic interface device, a virtual reality interface device, or a multimodal interface device; or receive a selection of an element of the causal hypergraph visualization communicated from at least one of the haptic interface device, the virtual reality interface device, or the multimodal interface device.

17. The system of claim 13, wherein the directed hypergraph data comprises multivariable, directed hypergraph data.

18. The system of claim 13, further comprising a hypergraph data generation module comprising instructions stored in at least one memory and executable by one or more processors to cause the hypergraph data generation module to:

generate the directed hypergraph data based on the identified plurality of causal links and the associations of the causal links with the plurality of predefined taxonomy categories.

19. The system of claim 13, further comprising a translation module communicatively coupled to the visualization and querying module, the at least one natural language text file, and at least one data file including the directed hypergraph data and data indicative of the casual links normalized with respect to the predefined taxonomy categories.

20. The system of claim 13, wherein each of the causal identification module and the normalization module includes at least one module suitable for transfer learning.

* * * * *